United States Patent
Jinkins et al.

(10) Patent No.: US 10,705,201 B1
(45) Date of Patent: Jul. 7, 2020

(54) RADAR BEAM SHARPENING SYSTEM AND METHOD

(71) Applicant: Rockwell Collins, Inc., Cedar Rapids, IA (US)

(72) Inventors: Richard D. Jinkins, Rewey, WI (US); Richard M. Rademaker, Rijswijk ZH (NL); Daniel L. Woodell, Holts Summit, MO (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 902 days.

(21) Appl. No.: 14/841,558

(22) Filed: Aug. 31, 2015

(51) Int. Cl.
| | |
|---|---|
| *G01S 13/87* | (2006.01) |
| *G01S 13/95* | (2006.01) |
| *G01S 13/89* | (2006.01) |
| *G01S 13/44* | (2006.01) |
| *G01S 7/06* | (2006.01) |

(52) U.S. Cl.
CPC ............... *G01S 13/89* (2013.01); *G01S 7/06* (2013.01); *G01S 13/4472* (2013.01); *G01S 13/953* (2013.01)

(58) Field of Classification Search
CPC ......... G01S 13/4472; G01S 13/95–958; G01S 7/06; G01S 13/89
See application file for complete search history.

(56) References Cited

U.S. PATENT DOCUMENTS

| | | |
|---|---|---|
| 2,416,155 A | 2/1947 | Chubb |
| 2,849,184 A | 8/1958 | Arden et al. |
| 2,929,059 A | 3/1960 | Parker |
| 2,930,035 A | 3/1960 | Altekruse |
| 2,948,892 A | 8/1960 | White |
| 2,965,894 A | 12/1960 | Sweeney |
| 2,994,966 A | 8/1961 | Senitsky et al. |

(Continued)

FOREIGN PATENT DOCUMENTS

| | | |
|---|---|---|
| DE | 196 49 838 | 4/1998 |
| EP | 0 556 351 B1 | 6/1995 |

(Continued)

OTHER PUBLICATIONS

Non-Final Office Action on U.S. Appl. No. 13/250,798 dated Feb. 26, 2016, 9 pages.

(Continued)

*Primary Examiner* — Matthew M Barker
(74) *Attorney, Agent, or Firm* — Donna P. Suchy

(57) ABSTRACT

An enhanced vision method or a weather radar system can be used with an aircraft and includes an antenna and a control circuit. The control circuit is configured to provide radar beams via the antenna toward external surroundings and is configured to receive radar returns. The control circuit is configured to process a collection of radar measurements from the radar returns, wherein each of the radar measurements is associated with a location determined using an antenna position, an antenna attitude, a beam sharpening angle, and a range. The radar measurements are processed to determine power density per grid cell associated with the power and location of the radar measurements, and the power density per grid cell is used to provide an image associated with the power and location of the radar measurements.

20 Claims, 9 Drawing Sheets

(56) References Cited

U.S. PATENT DOCUMENTS

| | | | |
|---|---|---|---|
| 3,031,660 A | 4/1962 | Young | |
| 3,049,702 A | 8/1962 | Schreitmueller | |
| 3,064,252 A | 11/1962 | Varela | |
| 3,070,795 A | 12/1962 | Chambers | |
| 3,071,766 A | 1/1963 | Fenn | |
| 3,072,903 A | 1/1963 | Meyer | |
| 3,089,801 A | 5/1963 | Tierney et al. | |
| 3,107,351 A | 10/1963 | Milam | |
| 3,113,310 A | 12/1963 | Standing | |
| 3,129,425 A | 4/1964 | Sanner | |
| 3,153,234 A | 10/1964 | Begeman et al. | |
| 3,175,215 A | 3/1965 | Blasberg et al. | |
| 3,212,088 A | 10/1965 | Alexander et al. | |
| 3,221,328 A | 11/1965 | Walter | |
| 3,241,141 A | 3/1966 | Wall | |
| 3,274,593 A | 9/1966 | Varela et al. | |
| 3,325,807 A | 6/1967 | Burns et al. | |
| 3,334,344 A | 8/1967 | Colby, Jr. | |
| 3,339,199 A | 8/1967 | Pichafroy | |
| 3,373,423 A | 3/1968 | Levy | |
| 3,397,397 A | 8/1968 | Barney | |
| 3,448,450 A | 6/1969 | Alfandari et al. | |
| 3,618,090 A | 11/1971 | Garrison | |
| 3,680,094 A | 7/1972 | Bayle et al. | |
| 3,716,855 A | 2/1973 | Asam | |
| 3,739,380 A | 6/1973 | Burdic et al. | |
| 3,781,878 A | 12/1973 | Kirkpatrick | |
| 3,810,175 A | 5/1974 | Bell | |
| 3,815,132 A | 6/1974 | Case et al. | |
| 3,816,718 A | 6/1974 | Hall et al. | |
| 3,851,758 A | 12/1974 | Makhijani et al. | |
| 3,866,222 A | 2/1975 | Young | |
| 3,885,237 A | 5/1975 | Kirkpatrick | |
| 3,956,749 A | 5/1976 | Magorian | |
| 4,024,537 A | 5/1977 | Hart | |
| 4,058,701 A | 11/1977 | Gruber et al. | |
| 4,058,710 A | 11/1977 | Altmann | |
| 4,063,218 A | 12/1977 | Basov et al. | |
| 4,235,951 A | 11/1980 | Swarovski | |
| 4,277,845 A | 7/1981 | Smith et al. | |
| 4,359,732 A * | 11/1982 | Martin | G01S 7/003 |
| | | | 342/149 |
| 4,405,986 A | 9/1983 | Gray | |
| 4,435,707 A | 3/1984 | Clark | |
| 4,481,519 A | 11/1984 | Margerum | |
| 4,532,515 A | 7/1985 | Cantrell et al. | |
| 4,594,676 A | 6/1986 | Breiholz et al. | |
| 4,595,925 A | 6/1986 | Hansen | |
| 4,598,292 A | 7/1986 | Devino | |
| 4,628,318 A | 12/1986 | Alitz | |
| 4,646,244 A | 2/1987 | Bateman et al. | |
| 4,649,388 A | 3/1987 | Atlas | |
| 4,654,665 A | 3/1987 | Kiuchi et al. | |
| 4,685,149 A | 8/1987 | Smith et al. | |
| 4,698,635 A * | 10/1987 | Hilton | G01C 21/005 |
| | | | 342/120 |
| 4,760,396 A | 7/1988 | Barney et al. | |
| 4,828,382 A | 5/1989 | Vermilion | |
| 4,843,398 A | 6/1989 | Houston et al. | |
| 4,912,477 A | 3/1990 | Lory et al. | |
| 4,914,436 A | 4/1990 | Bateman et al. | |
| 4,924,401 A | 5/1990 | Bice et al. | |
| 4,939,513 A | 7/1990 | Paterson et al. | |
| 4,951,059 A | 8/1990 | Taylor, Jr. | |
| 4,953,972 A | 9/1990 | Zuk | |
| 4,965,573 A | 10/1990 | Gallagher et al. | |
| 4,987,419 A | 1/1991 | Salkeld | |
| 5,045,855 A | 9/1991 | Moreira | |
| 5,047,779 A | 9/1991 | Hager | |
| 5,047,781 A | 9/1991 | Bleakney | |
| 5,049,886 A | 9/1991 | Seitz et al. | |
| 5,132,693 A * | 7/1992 | Werp | B64C 1/36 |
| | | | 342/179 |
| 5,166,688 A | 11/1992 | Moreira | |
| 5,173,703 A | 12/1992 | Mangiapane et al. | |
| 5,175,554 A | 12/1992 | Mangiapane et al. | |
| 5,198,819 A | 3/1993 | Susnjara | |
| 5,202,690 A | 4/1993 | Frederick | |
| 5,247,303 A | 9/1993 | Cornelius et al. | |
| 5,273,553 A | 12/1993 | Hoshi et al. | |
| 5,311,183 A | 5/1994 | Mathews et al. | |
| 5,329,391 A | 7/1994 | Miyamoto et al. | |
| 5,332,998 A | 7/1994 | Avignon et al. | |
| 5,345,241 A | 9/1994 | Huddle | |
| 5,365,356 A | 11/1994 | McFadden | |
| 5,442,364 A | 8/1995 | Lee et al. | |
| 5,469,167 A * | 11/1995 | Polge | G01S 13/90 |
| | | | 342/194 |
| 5,481,270 A * | 1/1996 | Urkowitz | G01S 13/28 |
| | | | 342/101 |
| 5,539,409 A | 7/1996 | Mathews et al. | |
| 5,559,515 A | 9/1996 | Alimena et al. | |
| 5,559,518 A | 9/1996 | Didomizio | |
| 5,566,840 A | 10/1996 | Waldner et al. | |
| 5,592,178 A | 1/1997 | Chang et al. | |
| 5,678,303 A | 10/1997 | Wichmann | |
| 5,736,957 A | 4/1998 | Raney | |
| 5,820,080 A | 10/1998 | Eschenbach | |
| 5,828,332 A | 10/1998 | Frederick | |
| 5,831,570 A | 11/1998 | Ammar et al. | |
| 5,839,080 A | 11/1998 | Muller et al. | |
| 5,847,673 A * | 12/1998 | DeBell | G01C 21/165 |
| | | | 342/25 C |
| 5,867,119 A | 2/1999 | Corrubia et al. | |
| 5,894,286 A | 4/1999 | Morand et al. | |
| 5,900,833 A * | 5/1999 | Sunlin | G01S 13/0209 |
| | | | 342/22 |
| 5,918,517 A | 7/1999 | Malapert et al. | |
| 5,920,276 A | 7/1999 | Frederick | |
| 5,923,279 A | 7/1999 | Bamler et al. | |
| 5,936,575 A | 8/1999 | Azzarelli et al. | |
| 5,942,062 A | 8/1999 | Hassall et al. | |
| 5,945,926 A | 8/1999 | Ammar et al. | |
| 5,950,512 A | 9/1999 | Fields | |
| 5,959,762 A | 9/1999 | Bandettini et al. | |
| 5,978,715 A | 11/1999 | Briffe et al. | |
| 6,002,347 A | 12/1999 | Daly et al. | |
| 6,023,240 A | 2/2000 | Sutton | |
| 6,061,016 A | 5/2000 | Lupinski et al. | |
| 6,061,022 A | 5/2000 | Menegozzi et al. | |
| 6,064,942 A | 5/2000 | Johnson et al. | |
| 6,075,484 A | 6/2000 | Daniel et al. | |
| 6,092,009 A | 7/2000 | Glover | |
| 6,112,141 A | 8/2000 | Briffe et al. | |
| 6,112,570 A | 9/2000 | Hruschak | |
| 6,122,570 A | 9/2000 | Muller et al. | |
| 6,127,944 A | 10/2000 | Daly et al. | |
| 6,128,066 A | 10/2000 | Yokozeki | |
| 6,128,553 A | 10/2000 | Gordon et al. | |
| 6,138,060 A | 10/2000 | Conner et al. | |
| 6,150,901 A | 11/2000 | Auken | |
| 6,154,151 A | 11/2000 | McElreath et al. | |
| 6,154,169 A | 11/2000 | Kuntman | |
| 6,157,339 A | 12/2000 | Sato et al. | |
| 6,157,891 A | 12/2000 | Lin | |
| 6,163,021 A | 12/2000 | Mickelson | |
| 6,166,661 A | 12/2000 | Anderson et al. | |
| 6,169,770 B1 | 1/2001 | Henely | |
| 6,178,391 B1 | 1/2001 | Anderson et al. | |
| 6,184,816 B1 | 2/2001 | Zheng et al. | |
| 6,188,330 B1 | 2/2001 | Glover | |
| 6,194,980 B1 | 2/2001 | Thon | |
| 6,199,008 B1 | 3/2001 | Aratow et al. | |
| 6,201,494 B1 | 3/2001 | Kronfeld | |
| 6,204,806 B1 | 3/2001 | Hoech | |
| 6,205,400 B1 | 3/2001 | Lin | |
| 6,208,284 B1 | 3/2001 | Woodell et al. | |
| 6,219,592 B1 | 4/2001 | Muller et al. | |
| 6,233,522 B1 | 5/2001 | Morici | |
| 6,236,351 B1 | 5/2001 | Conner et al. | |
| 6,259,400 B1 | 7/2001 | Higgins et al. | |
| 6,266,114 B1 | 7/2001 | Skarohlid | |
| 6,278,799 B1 | 8/2001 | Hoffman | |
| 6,281,832 B1 | 8/2001 | McElreath | |

(56) References Cited

U.S. PATENT DOCUMENTS

| | | |
|---|---|---|
| 6,285,298 B1 | 9/2001 | Gordon |
| 6,285,337 B1 | 9/2001 | West et al. |
| 6,285,926 B1 | 9/2001 | Weiler et al. |
| 6,289,277 B1 | 9/2001 | Feyereisen et al. |
| 6,311,108 B1 | 10/2001 | Ammar et al. |
| 6,317,468 B1 | 11/2001 | Meyer |
| 6,317,690 B1 | 11/2001 | Gia |
| 6,317,872 B1 | 11/2001 | Gee et al. |
| 6,340,946 B1 | 1/2002 | Wolfson et al. |
| 6,345,127 B1 | 2/2002 | Mitchell |
| 6,359,585 B1 | 3/2002 | Bechman et al. |
| 6,366,013 B1 | 4/2002 | Leenders et al. |
| 6,373,418 B1 | 4/2002 | Abbey |
| 6,374,286 B1 | 4/2002 | Gee et al. |
| 6,377,202 B1 | 4/2002 | Kropfli et al. |
| 6,377,892 B1 | 4/2002 | Johnson et al. |
| 6,388,607 B1 | 5/2002 | Woodell |
| 6,388,608 B1 | 5/2002 | Woodell et al. |
| 6,388,724 B1 | 5/2002 | Campbell et al. |
| 6,389,354 B1 | 5/2002 | Hicks et al. |
| 6,401,038 B2 | 6/2002 | Gia |
| 6,411,890 B1 | 6/2002 | Zimmerman |
| 6,421,000 B1 | 7/2002 | McDowell |
| 6,421,603 B1 | 7/2002 | Pratt et al. |
| 6,424,288 B1 | 7/2002 | Woodell |
| 6,426,717 B1 | 7/2002 | Maloratsky |
| 6,426,720 B1 | 7/2002 | Ross et al. |
| 6,427,122 B1 | 7/2002 | Lin |
| 6,430,480 B1 * | 8/2002 | Ammar ............... F41G 7/2226 701/16 |
| 6,441,773 B1 | 8/2002 | Kelly et al. |
| 6,445,310 B1 | 9/2002 | Bateman et al. |
| 6,448,922 B1 | 9/2002 | Kelly |
| 6,452,511 B1 | 9/2002 | Kelly et al. |
| 6,456,236 B1 | 9/2002 | Hauck et al. |
| 6,456,238 B1 | 9/2002 | Posey |
| 6,462,703 B2 | 10/2002 | Hedrick |
| 6,473,026 B1 | 10/2002 | Ali-Mehenni et al. |
| 6,473,037 B2 | 10/2002 | Vail et al. |
| 6,473,240 B1 | 10/2002 | Dehmlow |
| 6,481,482 B1 | 11/2002 | Shimotomai |
| 6,492,934 B1 | 12/2002 | Hwang et al. |
| 6,501,424 B1 | 12/2002 | Haendel et al. |
| 6,512,476 B1 | 1/2003 | Woodell |
| 6,512,527 B1 | 1/2003 | Barber et al. |
| 6,516,272 B2 | 2/2003 | Lin |
| 6,516,283 B2 | 2/2003 | McCall et al. |
| 6,520,056 B1 | 2/2003 | Nemeth et al. |
| 6,525,674 B1 | 2/2003 | Kelly et al. |
| 6,531,669 B1 | 3/2003 | Miller et al. |
| 6,549,161 B1 | 4/2003 | Woodell |
| 6,567,728 B1 | 5/2003 | Kelly et al. |
| 6,574,030 B1 | 6/2003 | Mosier |
| 6,577,947 B1 | 6/2003 | Kronfeld et al. |
| 6,590,528 B1 | 7/2003 | Dewulf |
| 6,591,171 B1 | 7/2003 | Ammar et al. |
| 6,593,875 B2 | 7/2003 | Bergin et al. |
| 6,600,443 B2 | 7/2003 | Landt |
| 6,603,425 B1 | 8/2003 | Woodell |
| 6,614,057 B2 | 9/2003 | Silvernail et al. |
| 6,650,275 B1 | 11/2003 | Kelly et al. |
| 6,650,291 B1 | 11/2003 | West et al. |
| 6,653,947 B2 | 11/2003 | Dwyer et al. |
| 6,667,710 B2 | 12/2003 | Cornell et al. |
| 6,681,668 B1 | 1/2004 | Smirle |
| 6,690,298 B1 | 2/2004 | Barber et al. |
| 6,690,299 B1 | 2/2004 | Suiter |
| 6,690,317 B2 | 2/2004 | Szeto et al. |
| 6,697,008 B1 | 2/2004 | Sternowski |
| 6,697,012 B2 | 2/2004 | Lodwig et al. |
| 6,710,663 B1 | 3/2004 | Berquist |
| 6,714,186 B1 | 3/2004 | Mosier et al. |
| 6,724,344 B1 | 4/2004 | Stockmaster et al. |
| 6,731,236 B1 | 5/2004 | Hager et al. |
| 6,738,011 B1 | 5/2004 | Evans |
| 6,739,929 B2 | 5/2004 | Furukawa et al. |
| 6,741,203 B1 | 5/2004 | Woodell |
| 6,741,208 B1 | 5/2004 | West et al. |
| 6,744,382 B1 | 6/2004 | Lapis et al. |
| 6,744,408 B1 | 6/2004 | Stockmaster |
| 6,757,624 B1 | 6/2004 | Hwang et al. |
| 6,760,155 B2 | 7/2004 | Murayama et al. |
| 6,771,626 B1 | 8/2004 | Golubiewski et al. |
| 6,782,392 B1 | 8/2004 | Weinberger et al. |
| 6,799,095 B1 | 9/2004 | Owen et al. |
| 6,803,245 B2 | 10/2004 | Auch et al. |
| 6,804,614 B1 | 10/2004 | McGraw et al. |
| 6,806,846 B1 | 10/2004 | West |
| 6,807,538 B1 | 10/2004 | Weinberger et al. |
| 6,813,777 B1 | 11/2004 | Weinberger et al. |
| 6,819,983 B1 | 11/2004 | McGraw |
| 6,822,617 B1 | 11/2004 | Mather et al. |
| 6,825,804 B1 | 11/2004 | Doty |
| 6,832,538 B1 | 12/2004 | Hwang |
| 6,839,017 B1 | 1/2005 | Dillman |
| 6,842,288 B1 | 1/2005 | Liu et al. |
| 6,850,185 B1 | 2/2005 | Woodell |
| 6,862,323 B1 | 3/2005 | Loper |
| 6,862,501 B2 | 3/2005 | He |
| 6,865,452 B2 | 3/2005 | Burdon |
| 6,879,280 B1 | 4/2005 | Bull et al. |
| 6,879,886 B2 | 4/2005 | Wilkins et al. |
| 6,882,302 B1 | 4/2005 | Woodell et al. |
| 6,908,202 B2 | 6/2005 | Graf et al. |
| 6,917,396 B2 | 7/2005 | Hiraishi et al. |
| 6,918,134 B1 | 7/2005 | Sherlock et al. |
| 6,933,885 B1 | 8/2005 | Stockmaster et al. |
| 6,938,258 B1 | 8/2005 | Weinberger et al. |
| 6,950,062 B1 | 9/2005 | Mather et al. |
| 6,959,057 B1 | 10/2005 | Tuohino |
| 6,972,727 B1 | 12/2005 | West et al. |
| 6,977,608 B1 | 12/2005 | Anderson et al. |
| 6,984,545 B2 | 1/2006 | Grigg et al. |
| 6,990,022 B2 | 1/2006 | Morikawa et al. |
| 6,992,614 B1 | 1/2006 | Joyce |
| 6,995,726 B1 | 2/2006 | West et al. |
| 6,998,648 B2 | 2/2006 | Silvernail |
| 6,998,908 B1 | 2/2006 | Sternowski |
| 6,999,022 B1 | 2/2006 | Vesel et al. |
| 6,999,027 B1 | 2/2006 | Stockmaster |
| 7,002,546 B1 | 2/2006 | Stuppi et al. |
| 7,010,398 B2 | 3/2006 | Wilkins et al. |
| 7,023,375 B2 | 4/2006 | Klausing et al. |
| 7,026,956 B1 | 4/2006 | Wenger et al. |
| 7,028,304 B1 | 4/2006 | Weinberger et al. |
| 7,030,945 B2 | 4/2006 | Umemoto et al. |
| 7,034,753 B1 | 4/2006 | Elsallal et al. |
| 7,042,387 B2 | 5/2006 | Ridenour et al. |
| 7,053,796 B1 | 5/2006 | Barber |
| 7,057,549 B2 | 6/2006 | Block |
| 7,064,680 B2 | 6/2006 | Reynolds et al. |
| 7,069,120 B1 | 6/2006 | Koenck et al. |
| 7,089,092 B1 | 8/2006 | Wood et al. |
| 7,092,645 B1 | 8/2006 | Sternowski |
| 7,098,913 B1 | 8/2006 | Etherington et al. |
| 7,109,912 B1 | 9/2006 | Paramore et al. |
| 7,109,913 B1 | 9/2006 | Paramore et al. |
| 7,123,260 B2 | 10/2006 | Brust |
| 7,129,885 B1 | 10/2006 | Woodell et al. |
| 7,145,501 B1 | 12/2006 | Manfred et al. |
| 7,148,816 B1 | 12/2006 | Carrico |
| 7,151,507 B1 | 12/2006 | Herting |
| 7,158,072 B1 | 1/2007 | Venkatachalam et al. |
| 7,161,525 B1 | 1/2007 | Finley et al. |
| 7,170,446 B1 | 1/2007 | West et al. |
| 7,170,959 B1 | 1/2007 | Abbey |
| 7,180,476 B1 | 2/2007 | Guell et al. |
| 7,191,406 B1 | 3/2007 | Barber et al. |
| 7,196,329 B1 | 3/2007 | Wood et al. |
| 7,205,933 B1 | 4/2007 | Snodgrass |
| 7,209,070 B2 | 4/2007 | Gilliland et al. |
| 7,212,216 B2 | 5/2007 | He et al. |
| 7,218,268 B2 | 5/2007 | Vandenberg |
| 7,219,011 B1 | 5/2007 | Barber |

(56) References Cited

U.S. PATENT DOCUMENTS

| | | | |
|---|---|---|---|
| 7,236,125 B2 * | 6/2007 | Tullsson | G01S 7/4026 342/147 |
| 7,242,343 B1 | 7/2007 | Woodell | |
| 7,242,345 B2 | 7/2007 | Raestad et al. | |
| 7,250,903 B1 | 7/2007 | McDowell | |
| 7,265,710 B2 | 9/2007 | Deagro | |
| 7,269,657 B1 | 9/2007 | Alexander et al. | |
| 7,272,472 B1 | 9/2007 | McElreath | |
| 7,273,403 B2 | 9/2007 | Yokota et al. | |
| 7,280,068 B2 | 10/2007 | Lee et al. | |
| 7,289,058 B2 | 10/2007 | Shima | |
| 7,292,178 B1 | 11/2007 | Woodell et al. | |
| 7,292,180 B1 | 11/2007 | Schober | |
| 7,295,150 B2 | 11/2007 | Burlet et al. | |
| 7,295,901 B1 | 11/2007 | Little et al. | |
| 7,301,496 B2 | 11/2007 | Honda et al. | |
| 7,307,576 B1 | 12/2007 | Koenigs | |
| 7,307,577 B1 | 12/2007 | Kronfeld et al. | |
| 7,307,583 B1 | 12/2007 | Woodell et al. | |
| 7,312,725 B2 | 12/2007 | Berson et al. | |
| 7,312,743 B2 | 12/2007 | Ridenour et al. | |
| 7,317,427 B2 | 1/2008 | Pauplis et al. | |
| 7,321,332 B2 | 1/2008 | Focke et al. | |
| 7,337,043 B2 | 2/2008 | Bull | |
| 7,349,154 B2 | 3/2008 | Aiura et al. | |
| 7,352,292 B2 | 4/2008 | Alter et al. | |
| 7,361,240 B2 | 4/2008 | Kim | |
| 7,372,394 B1 | 5/2008 | Woodell et al. | |
| 7,373,223 B2 | 5/2008 | Murphy | |
| 7,375,678 B2 | 5/2008 | Feyereisen et al. | |
| 7,379,014 B1 | 5/2008 | Woodell et al. | |
| 7,379,796 B2 | 5/2008 | Walsdorf et al. | |
| 7,381,110 B1 | 6/2008 | Sampica et al. | |
| 7,417,578 B1 | 8/2008 | Woodell et al. | |
| 7,417,579 B1 | 8/2008 | Woodell | |
| 7,423,578 B1 | 9/2008 | Tietjen | |
| 7,446,697 B2 | 11/2008 | Burlet et al. | |
| 7,446,938 B2 | 11/2008 | Miyatake et al. | |
| 7,452,258 B1 | 11/2008 | Marzen et al. | |
| 7,474,262 B2 | 1/2009 | Alland | |
| 7,479,920 B2 | 1/2009 | Niv | |
| 7,486,220 B1 | 2/2009 | Kronfeld et al. | |
| 7,486,291 B2 | 2/2009 | Berson et al. | |
| 7,492,304 B1 | 2/2009 | Woodell et al. | |
| 7,492,305 B1 | 2/2009 | Woodell et al. | |
| 7,515,087 B1 | 4/2009 | Woodell et al. | |
| 7,515,088 B1 | 4/2009 | Woodell et al. | |
| 7,525,448 B1 | 4/2009 | Wilson et al. | |
| 7,528,765 B1 | 5/2009 | Woodell et al. | |
| 7,528,915 B2 | 5/2009 | Choi et al. | |
| 7,541,970 B1 | 6/2009 | Godfrey et al. | |
| 7,541,971 B1 | 6/2009 | Woodell et al. | |
| 7,551,451 B2 | 6/2009 | Kim et al. | |
| 7,557,735 B1 | 7/2009 | Woodell et al. | |
| 7,566,254 B2 | 7/2009 | Sampica et al. | |
| 7,570,177 B2 | 8/2009 | Reynolds et al. | |
| 7,576,680 B1 | 8/2009 | Woodell | |
| 7,603,209 B2 | 10/2009 | Dwyer et al. | |
| 7,609,200 B1 | 10/2009 | Woodell et al. | |
| 7,612,706 B2 | 11/2009 | Honda et al. | |
| 7,616,150 B1 | 11/2009 | Woodell | |
| 7,633,428 B1 | 12/2009 | McCusker et al. | |
| 7,633,430 B1 | 12/2009 | Wichgers et al. | |
| 7,633,584 B2 | 12/2009 | Umemoto et al. | |
| 7,639,175 B1 | 12/2009 | Woodell | |
| 7,664,601 B2 | 2/2010 | Daly, Jr. | |
| 7,675,461 B1 | 3/2010 | McCusker et al. | |
| 7,693,621 B1 | 4/2010 | Chamas | |
| 7,696,921 B1 | 4/2010 | Finley et al. | |
| 7,714,767 B1 | 5/2010 | Kronfeld et al. | |
| 7,733,264 B1 | 6/2010 | Woodell et al. | |
| 7,783,427 B1 | 8/2010 | Woodell et al. | |
| 7,783,429 B2 | 8/2010 | Walden et al. | |
| 7,791,529 B2 | 9/2010 | Filias et al. | |
| 7,808,422 B1 | 10/2010 | Woodell et al. | |
| 7,814,676 B2 | 10/2010 | Sampica et al. | |
| 7,843,380 B1 | 11/2010 | Woodell | |
| 7,859,448 B1 | 12/2010 | Woodell et al. | |
| 7,859,449 B1 | 12/2010 | Woodell et al. | |
| 7,864,103 B2 | 1/2011 | Weber et al. | |
| 7,868,811 B1 | 1/2011 | Woodell et al. | |
| 7,872,594 B1 | 1/2011 | Vesel | |
| 7,889,117 B1 | 2/2011 | Woodell et al. | |
| 7,889,118 B1 | 2/2011 | Finley et al. | |
| 7,927,440 B2 | 4/2011 | Matsuhira | |
| 7,929,086 B2 | 4/2011 | Toyama et al. | |
| 7,965,223 B1 | 6/2011 | McCusker | |
| 7,965,225 B1 | 6/2011 | Dickerson et al. | |
| 8,035,547 B1 | 10/2011 | Flanigan et al. | |
| 8,038,498 B2 | 10/2011 | Miyauchi et al. | |
| 8,045,098 B2 | 10/2011 | Kitagawa et al. | |
| 8,059,025 B2 | 11/2011 | D'Addio | |
| 8,068,050 B2 * | 11/2011 | Christianson | G01S 13/953 342/26 B |
| 8,068,984 B2 | 11/2011 | Smith et al. | |
| 8,072,368 B1 | 12/2011 | Woodell | |
| 8,077,078 B1 | 12/2011 | Woodell et al. | |
| 8,102,487 B2 | 1/2012 | Kitagawa et al. | |
| 8,118,075 B2 | 2/2012 | Sampica et al. | |
| 8,137,498 B2 | 3/2012 | Sampica et al. | |
| 8,140,223 B2 | 3/2012 | Whitehead et al. | |
| 8,159,464 B1 | 4/2012 | Gribble et al. | |
| 8,232,917 B2 | 7/2012 | Scherzinger et al. | |
| 8,296,065 B2 | 10/2012 | Haynie et al. | |
| 8,373,580 B2 | 2/2013 | Bunch et al. | |
| 8,410,975 B1 | 4/2013 | Bell et al. | |
| 8,477,062 B1 | 7/2013 | Kanellis | |
| 8,486,535 B1 | 7/2013 | Nemeth et al. | |
| 8,493,241 B2 | 7/2013 | He | |
| 8,515,600 B1 | 8/2013 | McCusker | |
| 8,540,002 B2 | 9/2013 | Sampica et al. | |
| 8,558,731 B1 | 10/2013 | Woodell | |
| 8,576,112 B2 | 11/2013 | Garrec et al. | |
| 8,583,315 B2 | 11/2013 | Whitehead et al. | |
| 8,594,879 B2 | 11/2013 | Roberge et al. | |
| 8,603,288 B2 | 12/2013 | Sampica et al. | |
| 8,634,993 B2 | 1/2014 | McClure et al. | |
| 8,639,416 B2 | 1/2014 | Jones et al. | |
| 8,643,533 B1 | 2/2014 | Woodell et al. | |
| 8,691,043 B2 | 4/2014 | Sampica et al. | |
| 8,717,226 B2 | 5/2014 | Bon et al. | |
| 8,773,301 B1 | 7/2014 | Woodell | |
| 8,896,480 B1 | 11/2014 | Wilson et al. | |
| 8,909,471 B1 | 12/2014 | Jinkins et al. | |
| 8,917,191 B1 | 12/2014 | Tiana et al. | |
| 8,936,057 B2 | 1/2015 | Sampica et al. | |
| 9,354,633 B1 | 5/2016 | McCusker et al. | |
| 9,500,746 B2 * | 11/2016 | Miles | G01S 17/66 |
| 9,529,081 B2 * | 12/2016 | Whelan | G01S 7/2923 |
| 9,613,269 B2 * | 4/2017 | Kilty | G06K 9/00476 |
| 10,037,124 B2 * | 7/2018 | Khatwa | G06F 3/04817 |
| 2001/0023390 A1 | 9/2001 | Gia | |
| 2001/0050372 A1 | 12/2001 | Krijn et al. | |
| 2001/0053648 A1 | 12/2001 | Furukawa et al. | |
| 2002/0039070 A1 | 4/2002 | Ververs et al. | |
| 2002/0111717 A1 | 8/2002 | Scherzinger et al. | |
| 2002/0116125 A1 | 8/2002 | Lin | |
| 2002/0116126 A1 | 8/2002 | Lin | |
| 2002/0158256 A1 | 10/2002 | Yamada et al. | |
| 2002/0179229 A1 | 12/2002 | Chuzles | |
| 2002/0185600 A1 | 12/2002 | Kerr | |
| 2002/0187284 A1 | 12/2002 | Kinoshita et al. | |
| 2003/0021491 A1 | 1/2003 | Brust | |
| 2003/0038916 A1 | 2/2003 | Nakano et al. | |
| 2003/0043315 A1 | 3/2003 | Umemoto et al. | |
| 2003/0071828 A1 | 4/2003 | Wilkins et al. | |
| 2003/0089214 A1 | 5/2003 | Fukuta et al. | |
| 2003/0093187 A1 | 5/2003 | Walker | |
| 2003/0102999 A1 | 6/2003 | Bergin et al. | |
| 2003/0156238 A1 | 8/2003 | Hiraishi et al. | |
| 2003/0160718 A1 | 8/2003 | Nagasaku | |
| 2003/0174396 A1 | 9/2003 | Murayama et al. | |
| 2003/0180528 A1 | 9/2003 | Flosenzier et al. | |
| 2003/0189606 A1 | 10/2003 | Moon et al. | |

(56) References Cited

U.S. PATENT DOCUMENTS

| | | |
|---|---|---|
| 2003/0195672 A1 | 10/2003 | He |
| 2003/0216859 A1 | 11/2003 | Martell et al. |
| 2003/0222887 A1 | 12/2003 | Wilkins et al. |
| 2004/0044445 A1 | 3/2004 | Burdon |
| 2004/0059473 A1 | 3/2004 | He |
| 2004/0066645 A1 | 4/2004 | Graf et al. |
| 2004/0072575 A1 | 4/2004 | Young et al. |
| 2004/0083038 A1 | 4/2004 | He |
| 2004/0160341 A1 | 8/2004 | Feyereisen et al. |
| 2004/0160364 A1 | 8/2004 | Regev |
| 2004/0181318 A1 | 9/2004 | Redmond et al. |
| 2004/0264549 A1 | 12/2004 | Hoole |
| 2005/0004748 A1 | 1/2005 | Pinto et al. |
| 2005/0052451 A1 | 3/2005 | Servantie |
| 2005/0126679 A1 | 6/2005 | Kim |
| 2005/0136625 A1 | 6/2005 | Henseler et al. |
| 2005/0150289 A1 | 7/2005 | Osborne |
| 2005/0174350 A1 | 8/2005 | Ridenour et al. |
| 2005/0200502 A1 | 9/2005 | Reusser et al. |
| 2005/0230563 A1 | 10/2005 | Corcoran, III |
| 2006/0004497 A1 | 1/2006 | Bull |
| 2006/0097895 A1 | 5/2006 | Reynolds et al. |
| 2006/0098452 A1 | 5/2006 | Choi et al. |
| 2006/0164284 A1 | 7/2006 | Pauplis et al. |
| 2006/0207967 A1 | 9/2006 | Bocko et al. |
| 2006/0215265 A1 | 9/2006 | Miyatake et al. |
| 2006/0227012 A1 | 10/2006 | He |
| 2006/0244636 A1 | 11/2006 | Rye et al. |
| 2006/0245171 A1 | 11/2006 | Kim et al. |
| 2006/0290253 A1 | 12/2006 | Yeo et al. |
| 2006/0290531 A1 | 12/2006 | Reynolds et al. |
| 2007/0001897 A1 | 1/2007 | Alland |
| 2007/0002078 A1 | 1/2007 | He et al. |
| 2007/0008214 A1 | 1/2007 | Wasiewicz |
| 2007/0013575 A1 | 1/2007 | Lee et al. |
| 2007/0018887 A1 | 1/2007 | Feyereisen et al. |
| 2007/0032951 A1 | 2/2007 | Tanenhaus et al. |
| 2007/0060063 A1 | 3/2007 | Wright et al. |
| 2007/0146364 A1 | 6/2007 | Aspen |
| 2007/0171094 A1 | 7/2007 | Alter et al. |
| 2007/0176794 A1 | 8/2007 | Feyereisen et al. |
| 2007/0179684 A1 | 8/2007 | He |
| 2007/0228586 A1 | 10/2007 | Merrill et al. |
| 2007/0247350 A1 | 10/2007 | Ryan |
| 2007/0279253 A1 | 12/2007 | Priest |
| 2007/0297736 A1 | 12/2007 | Sherman et al. |
| 2008/0018524 A1 | 1/2008 | Christianson |
| 2008/0051947 A1 | 2/2008 | Kemp |
| 2008/0074308 A1 | 3/2008 | Becker et al. |
| 2008/0111731 A1 | 5/2008 | Hubbard et al. |
| 2008/0145610 A1 | 6/2008 | Muller et al. |
| 2008/0180351 A1 | 7/2008 | He |
| 2008/0305721 A1 | 12/2008 | Ohashi et al. |
| 2009/0040070 A1 | 2/2009 | Alter et al. |
| 2009/0040772 A1 | 2/2009 | Laney |
| 2009/0046229 A1 | 2/2009 | Umemoto et al. |
| 2009/0148682 A1 | 6/2009 | Higuchi |
| 2009/0152391 A1 | 6/2009 | McWhirk |
| 2009/0153783 A1 | 6/2009 | Umemoto |
| 2009/0164067 A1 | 6/2009 | Whitehead et al. |
| 2009/0207048 A1 | 8/2009 | He et al. |
| 2009/0279030 A1 | 11/2009 | Toyama et al. |
| 2009/0279175 A1 | 11/2009 | Laney et al. |
| 2010/0033499 A1 | 2/2010 | Gannon et al. |
| 2010/0103353 A1 | 4/2010 | Yamada |
| 2010/0297406 A1 | 11/2010 | Schaffer et al. |
| 2010/0312428 A1 | 12/2010 | Roberge et al. |
| 2010/0312461 A1 | 12/2010 | Haynie et al. |
| 2011/0054729 A1 | 3/2011 | Whitehead et al. |
| 2011/0075070 A1 | 3/2011 | Kitagawa et al. |
| 2011/0141405 A1 | 6/2011 | Kitagawa et al. |
| 2011/0165361 A1 | 7/2011 | Sherman et al. |
| 2011/0184594 A1 | 7/2011 | Manfred et al. |
| 2011/0282580 A1 | 11/2011 | Mohan |
| 2012/0053831 A1 | 3/2012 | Halder |
| 2012/0150426 A1 | 6/2012 | Conway |
| 2012/0174445 A1 | 7/2012 | Jones et al. |
| 2012/0215410 A1 | 8/2012 | McClure et al. |
| 2013/0041529 A1 | 2/2013 | He et al. |
| 2016/0011334 A1* | 1/2016 | Khatwa ............ G01W 1/00 702/3 |
| 2016/0131739 A1 | 5/2016 | Jinkins et al. |

FOREIGN PATENT DOCUMENTS

| | | |
|---|---|---|
| EP | 0 962 752 A1 | 12/1999 |
| GB | 0 814 744 A | 6/1959 |
| JP | 01-210328 | 8/1989 |
| JP | 05-200880 | 8/1993 |
| JP | 05-293895 | 11/1993 |
| JP | 06-051484 | 2/1994 |
| JP | H08-220547 A | 8/1996 |
| JP | 09-057779 | 3/1997 |
| JP | 10-156853 | 6/1998 |
| JP | 10-244589 | 9/1998 |
| JP | 2000-141388 | 5/2000 |
| JP | 2004-233590 | 8/2004 |
| JP | 2004-354645 | 12/2004 |
| JP | 2006-218658 | 8/2006 |
| JP | 2006-334912 | 12/2006 |
| JP | 2006-348208 | 12/2006 |
| JP | 2007-206559 | 8/2007 |
| JP | 2007-302398 A | 11/2007 |
| JP | 2008-238607 | 1/2008 |
| WO | WO-93/05634 | 3/1993 |
| WO | WO-2011/089474 A2 | 7/2011 |

OTHER PUBLICATIONS

Notice of Allowance on U.S. Appl. No. 12/263,282 dated Jan. 29, 2016, 8 pages.
Notice of Allowance on U.S. Appl. No. 14/301,199 dated Mar. 1, 2016, 11 pages.
U.S. Appl. No. 11/851,323, filed Sep. 6, 2007, McCusker.
U.S. Appl. No. 11/863,219, filed Sep. 27, 2007, Woodell.
U.S. Appl. No. 11/863,221, filed Sep. 27, 2007, Woodell.
U.S. Appl. No. 11/899,801, filed Sep. 6, 2007, Woodell et al.
U.S. Appl. No. 11/900,002, filed Sep. 6, 2007, Woodell et al.
U.S. Appl. No. 12/167,200, filed Jul. 2, 2008, Woodell et al.
U.S. Appl. No. 12/167,203, filed Jul. 2, 2008, Woodell.
U.S. Appl. No. 12/167,208, filed Jul. 2, 2008, Dickerson et al.
U.S. Appl. No. 12/180,293, filed Jul. 25, 2008, Woodell et al.
U.S. Appl. No. 12/236,464, filed Sep. 23, 2008, Rockwell Collins.
U.S. Appl. No. 12/786,169, filed May 24, 2010, Nemeth et al.
U.S. Appl. No. 13/224,992, filed Sep. 2, 2011, Hufnagel et al.
U.S. Appl. No. 13/250,307, filed Sep. 30, 2011, Jinkins.
U.S. Appl. No. 13/250,798, filed Sep. 30, 2011, Jinkins.
U.S. Appl. No. 13/627,788, filed Sep. 26, 2012, Rockwell Collins.
U.S. Appl. No. 13/857,955, filed Apr. 5, 2013, Barber et al.
U.S. Appl. No. 13/250,798, filed Sep. 30, 2011, Rockwell Collins.
U.S. Appl. No. 14/301,199, filed Jun. 10, 2014, Rockwell Collins.
U.S. Appl. No. 14/482,681, filed Sep. 10, 2014, Rockwell Collins.
"MountainScope™ on a TabletPC," PCAvionics™, printed from website www.pcavionics.com on Aug. 28, 2007, 1 page.
TAWS Class A and Class B, Terrain Awareness and Warning Systems, Universal® Avionics Systems Corporation, Sep. 2007, 6 pages.
"TAWS Terrain Awareness and Warning System," Universal® Avionics, printed from website www.uasc.com on Aug. 28, 2007, 2 pages.
Adams, Charlotte, "Synthetic Vision: Picturing the Future," Avionics magazine, Oct. 1, 2006, printed from website www.aviationtoday.com, 4 pages.
Adams, Charlotte, "Synthetic Vision: Picturing the Future," Avionics magazine, Solutions for Global Airspace Electronics, Oct. 2006, cover and pp. 22-29.
Airports Authority of India, Chapter 7: Visual Aids for Navigation—Lights, available prior to Jan. 1, 2005, retrieved from the internet at: http://www.aai.aero/aai_employees/chapter_7.pdf on Sep. 26, 2014, 33 pages.

(56) References Cited

OTHER PUBLICATIONS

Blue Mountain Avionics' Products, printed from website www.bluemountainavionics.com on Aug. 28, 2007, 4 pages.
Brailovsky et al., REVS122: A Radar-Based Enhanced Vision System for Degraded Visual Environments, Proc. of SPIE vol. 9087 908708-1, retrieved from the internet at http://proceedings.spiedigitallibrary.org on Jun. 25, 2014, 13 pages.
Carter, S. P., D. D. Blankenship, M. E. Peters, D. A. Young, J. W. Holt, and D. L. Morse (2007), Radar-based subglacial lake classification in Antarctica, Geochem. Geophys. Geosyst., 8, 003016, doi:10.1029/2006GC001408, 20 pages.
Federal Aviation Administration, Advisory Circular AC 90-106, "Enhanced Flight Vision Systems", initiated by AFS-400, dated Jun. 2, 2010, 55 pages.
Federal Aviation Administration, Aeronautical Information Manual (AIM) Basic Flight Information and ATC Procedures, dated Jul. 24, 2014, 2 pages.
Final Office Action on U.S. Appl. No. 13/250,798 dated Sep. 4, 2014, 22 pages.
Final Office Action on U.S. Appl. No. 13/867,556 dated Jul. 3, 2014, 11 pages.
Final Office Action on U.S. Appl. No. 13/250,307 dated Jun. 11, 2014, 8 pages.
Final Office Action on U.S. Appl. No. 12/236,464, dated Dec. 5, 2011, 15 pages.
Final Office Action on U.S. Appl. No. 13/250,798 dated Aug. 7, 2015, 21 pages.
Fountain, J.R., Digital Terrain Systems, Airborne Navigation Systems Workshop (Digest No. 1997/169), IEE Colloquium, pp. 4/1-4/6, Feb. 21, 1997.
G2000, Garmin, printed from website https://buy.garmin.com/shop/shop.do?cID=153&pID=97668 on Jun. 28, 2011, 2 pages.
G3000, Garmin, printed from website https://buy.garmin.com/shop/shop.do?cID=153&pID=66916 on Jun. 28, 2011, 2 pages.
G5000, Garmin, printed from website https://buy.garmin.com/shop/shop.do?cID=153&pID=90821&ra=true on Apr. 20, 2011, 2 pages.
Honeywell, RDR-4B Forward looking windshear detection / weather radar system user's manual with radar operating guidelines, Rev. 6, Jul. 2003, 106 pages.
Johnson, A., et al., Vision Guided Landing of an Autonomous Helicopter in Hazardous Terrain, Robotics and Automation, 2005. ICRA 2005. Proceedings of the 2005 IEEE International Conference, pp. 3966-3971, Apr. 18-22, 2005.
Kuntman, D., Airborne system to address leading cause of injuries in non-fatal airline accidents, ICAO Journal, Mar. 2000, 4 pages.
Non-Final Office Action on U.S. Appl. No. 13/250,798 dated Mar. 18, 2015, 21 pages.
Non-Final Office Action on U.S. Appl. No. 14/301,199 dated Sep. 9, 2015, 18 pages.
Notice of Allowance for U.S. Appl. No. 11/863,215, dated Oct. 13, 2009, 8 pages.
Notice of Allowance for U.S. Appl. No. 11/863,219, dated Jun. 23, 2009, 7 pages.
Notice of Allowance for U.S. Appl. No. 11/863,221, dated Aug. 2, 2010, 9 pages.
Notice of Allowance for U.S. Appl. No. 11/899,801, dated Aug. 19, 2010, 5 pages.
Notice of Allowance for U.S. Appl. No. 11/900,002, dated Sep. 14, 2010, 5 pages.
Notice of Allowance for U.S. Appl. No. 12/009,372, dated Oct. 13, 2011, 8 pages.
Notice of Allowance for U.S. Appl. No. 12/009,373, dated Jun. 16, 2010, 4 pages.
Notice of Allowance for U.S. Appl. No. 12/009,472, dated Sep. 5, 2013, 8 pages.
Notice of Allowance for U.S. Appl. No. 12/167,200, dated Oct. 28, 2010, 5 pages.
Notice of Allowance for U.S. Appl. No. 12/167,203, dated Jun. 21, 2013, 7 pages.
Notice of Allowance for U.S. Appl. No. 12/167,208, dated Mar. 21, 2011, 8 pages.
Notice of Allowance for U.S. Appl. No. 12/180,293, dated Aug. 4, 2011, 8 pages.
Notice of Allowance for U.S. Appl. No. 12/786,169, dated Mar. 28, 2013, 6 pages.
Notice of Allowance for U.S. Appl. No. 13/538,957, dated Oct. 3, 2013, 13 pages.
Notice of Allowance on U.S. Appl. No. 13/241,051 dated Aug. 28, 2014, 9 pages.
Notice of Allowance on U.S. Appl. No. 13/247,742 dated Jul. 30, 2014, 9 pages.
Office Action for U.S. Appl. No. 11/851,323, dated Dec. 15, 2010, 13 pages.
Office Action for U.S. Appl. No. 11/851,323, dated Aug. 6, 2009, 23 pages.
Office Action for U.S. Appl. No. 11/851,323, dated Jul. 5, 2012, 23 pages.
Office Action for U.S. Appl. No. 11/863,215, dated May 27, 2009, 5 pages.
Office Action for U.S. Appl. No. 11/863,215, dated Nov. 12, 2008, 8 pages.
Office Action for U.S. Appl. No. 11/863,219, dated Dec. 12, 2008, 7 pages.
Office Action for U.S. Appl. No. 11/863,221, dated Dec. 18, 2009, 5 pages.
Office Action for U.S. Appl. No. 11/863,221, dated Dec. 8, 2008, 8 pages.
Office Action for U.S. Appl, No. 11/863,221, dated May 26, 2009, 5 pages.
Office Action for U.S. Appl. No. 12/009,372, dated Dec. 20, 2010, 10 pages.
Office Action for U.S. Appl. No. 12/009,372, dated Jun. 13, 2011, 9 pages.
Office Action for U.S. Appl. No. 12/009,373, dated Dec. 30, 2009, 14 pages.
Office Action for U.S. Appl. No. 12/009,472, dated Apr. 16, 2012, 16 pages.
Office Action for U.S. Appl. No. 12/009,472, dated Jan. 14, 2011, 14 pages.
Office Action for U.S. Appl. No. 12/009,472, dated Mar. 20, 2013, 15 pages.
Office Action for U.S. Appl. No. 12/009,472, dated Nov. 3, 2011, 15 pages.
Office Action for U.S. Appl. No. 12/009,472, dated Nov. 9, 2012, 15 pages.
Office Action for U.S. Appl. No. 12/167,200, dated Jul. 21, 2010, 6 pages.
Office Action for U.S. Appl. No. 12/167,203, dated Aug. 26, 2010, 9 pages.
Office Action for U.S. Appl. No. 12/167,203, dated Jul. 20, 2011, 6 pages.
Office Action for U.S. Appl. No. 12/167,203, dated Mar. 7, 2013, 5 pages.
Office Action for U.S. Appl. No. 12/167,203, dated Oct. 31, 2011, 5 pages.
Office Action for U.S. Appl. No. 12/167,203, dated Sep. 21, 2012, 6 pages.
Office Action for U.S. Appl. No. 12/167,208, dated Dec. 30, 2009, 10 pages.
Office Action for U.S. Appl. No. 12/167,208, dated Feb. 7, 2011, 8 pages.
Office Action for U.S. Appl. No. 12/167,208, dated Jun. 3, 2010, 11 pages.
Office Action for U.S. Appl. No. 12/167,208, dated Oct. 19, 2010, 8 pages.
Office Action for U.S. Appl. No. 12/180,293, dated Jan. 4, 2011, 5 pages.
Office Action for U.S. Appl. No. 12/180,293, dated Jul. 28, 2010, 8 pages.
Office Action for U.S. Appl. No. 12/263,282, dated Jan. 5, 2012, 10 pages.

(56) References Cited

OTHER PUBLICATIONS

Office Action for U.S. Appl. No. 12/786,169, dated Jan. 18, 2013, 14 pages.
Office Action for U.S. Appl. No. 12/892,563, dated Feb. 19, 2013, 12 pages.
Office Action for U.S. Appl. No. 12/976,871, dated Feb. 15, 2012, 8 pages.
Office Action for U.S. Appl. No. 12/976,871, dated Jul. 10, 2012, 4 pages.
Office Action for U.S. Appl. No. 12/976,871, dated May 6, 2013, 5 pages.
Office Action for U.S. Appl. No. 12/976,871, dated Nov. 21, 2012, 5 pages.
Office Action for U.S. Appl. No. 12/976,871, dated Oct. 9, 2013, 5 pages.
Office Action for U.S. Appl. No. 13/183,314, dated Aug. 14, 2013, 11 pages.
Office Action for U.S. Appl. No. 13/183,314, dated Mar. 28, 2013, 12 pages.
Office Action for U.S. Appl. No. 13/224,992, dated Feb. 28, 2013, 10 pages.
Office Action for U.S. Appl. No. 13/250,307, dated Nov. 5, 2013, 11 pages.
Office Action for U.S. Appl. No. 13/474,559, dated Aug. 28, 2013, 10 pages.
Office Action for U.S. Appl. No. 13/474,559, dated Dec. 28, 2012, 8 pages.
Office Action for U.S. Appl. No. 13/538,957, dated Apr. 4, 2013, 19 pages.
Office Action for U.S. Appl. No. 13/538,957, dated Oct. 5, 2012, 18 pages.
Office Action for U.S. Appl. No. 13/743,182, dated Apr. 8, 2013, 10 pages.
Office Action for U.S. Appl. No. 12/786,169, dated Jul. 20, 2012, 8 pages.
Office Action in Japanese Patent Application 2015-116688, dated Aug. 25, 2015, 4 pages.
Office Action in Japanese Patent Application 2015-116716, dated Aug. 25, 2015, 3 pages.
Office Action on U.S. Appl. No. 12/236,464, dated Jul. 12, 2013, 17 pages.
Office Action on U.S. Appl. No. 11/787,460, dated Mar. 19, 2010, 16 pages.
Office Action on U.S. Appl. No. 11/787,460, dated Sep. 16, 2009, 15 pages.
Office Action on U.S. Appl. No. 12/236,464, dated Feb. 11, 2014, 21 pages.
Office Action on U.S. Appl. No. 12/236,464, dated Jun. 22, 2011, 14 pages.
Office Action on U.S. Appl. No. 12/892,563, dated May 7, 2013, 6 pages.
Office Action on U.S. Appl. No. 12/892,563, dated Oct. 10, 2012, 12 pages.
Office Action on U.S. Appl. No. 13/241,051 dated Feb. 27, 2014, 21 pages.
Office Action on U.S. Appl. No. 13/247,742 dated Dec. 3, 2013, 11 pages.
Office Action on U.S. Appl. No. 13/250,798 dated Apr. 23, 2014, 15 pages.
Office Action on U.S. Appl. No. 13/627,788 dated Jul. 28, 2014, 10 pages.
Office Action on U.S. Appl. No. 13/867,556 dated Feb. 7, 2014, 11 pages.
Office Action U.S. Appl. No. 11/787,460, dated Aug. 31, 2010, 18 pages.
Office Action with English Translation received in Korean Patent Application 10-2010-7017278, dated Aug. 26, 2015, 5 pages.
Pictures of DELPHINS, printed from website www.tunnel-in-the-sky.tudelft.nl on Aug. 28, 2007, 4 pages.
REVS Product Information Sheet, Sierra Nevada Corporation, dated May 7, 2014, 2 pages.
Skolnik, Introduction to Radar Systems, McGraw Hill Book Company, 2001, 3 pages.
Skolnik, Radar Handbook (McGraw Hill Book Company), 1990, 23 pages.
Synthetic Vision System, en.wikipedia.org/wiki/Synthetic_vision_system, retrieved Feb. 28, 2013, 4 pages.
Technical Standard Order, TSO-C115b, Airborne Area Navigation Equipment Using Multi-Sensor Inputs, Department of Transportation, Federal Aviation Administration, Sep. 30, 1994, 11 pages.
U.S. Office Action on U.S. Appl. No. 11/900,002 dated Jun. 8, 2010, 7 pages.
U.S. Office Action on U.S. Appl. No. 13/247,742 dated Apr. 16, 2014, 15 pages.
Vadlamani, A., et al., Improving the detection capability of spatial failure modes using downward-looking sensors in terrain database integrity monitors, Digital Avionics Systems Conference, 2003. DASC-03. The 22nd, vol. 2, pp. 9C.5-91-12 vol. 2, Oct. 12-16, 2003.
Van Kasteren, Joost, "Tunnel-in-the-Sky, Synthetic vision simplifies the pilot's job and enhances safety," printed from website www.delftoutlook.tudelft.nl on Aug. 28, 2007, 13 pages.
Walker, GD-Itronix Dynavue Technology, The Ultimate Outdoor-Readable Touch-Screen Display, Rugged PC Review, 4 pages.
Wang et al., A Simple Based on DSP Antenna Controller of Weather Radar, 2001 CIE International Conference, 4 pages.
First Office Action on Korean Patent Application No. 10-2016-7013740, dated Sep. 19, 2016, 7 pages.
McGray et al., Air Operators, Airlines, Manufacturers and Interested Industry Stakeholders & Aero Chart Forum-Utilizing EFVS technology and incorporating it into Faa NextGen, Federal Aviation Administration, Apr. 23 & 30, 2014, 34 pages.
Non-Final Office Action on U.S. Appl. No. 13/250,798, dated Sep. 9, 2016, 6 pages.
Non-Final Office Action on U.S. Appl. No. 14/536,330 dated Jul. 13, 2016, 12 pages.
Notice of Allowance on U.S. Appl. No. 13/250,798, dated Sep. 28, 2016, 10 pages.

\* cited by examiner

RADAR BEAM SHARPENING SYSTEM AND METHOD

CROSS-REFERENCE TO RELATED PATENT APPLICATIONS

The present application is related to U.S. Pat. No. 8,773,301 filed May 17, 2012 by Woodell et al., U.S. Pat. No. 9,939,526 filed Nov. 7, 2014 by Jinkins et al., U.S. Pat. No. 9,733,349 filed Sep. 10, 2014 by Wood et al., U.S. Pat. No. 9,384,586 filed Jun. 10, 2014 by McCusker et al., U.S. Pat. No. 9,024,805 filed Sep. 26, 2012 by Jinkins et al., U.S. Pat. No. 8,643,533 filed Sep. 28, 2010 by Woodell et al., U.S. Pat. No. 9,562,788 filed Sep. 30, 2011 by Jinkins et al., U.S. Pat. No. 8,977,491 filed Sep. 28, 2008 by McCusker et al., U.S. Pat. No. 7,889,117 filed Jul. 2, 2008 by Woodell et al., U.S. Pat. No. 8,077,078 filed Jul. 25, 2008 by Woodell et al., U.S. Pat. No. 8,896,480 filed Sep. 28, 2011 by Wilson et al., U.S. Pat. No. 8,515,600 filed Sep. 6, 2007 by McCusker, U.S. Pat. No. 8,755,954 filed Sep. 22, 2011 by McCusker et al., U.S. Pat. No. 8,917,191 filed Oct. 31, 2008 by Tiana et al., U.S. Pat. No. 9,354,633 filed Oct. 31, 2008 by McCusker et al., and U.S. Pat. No. 8,077,078 filed Jul. 25, 2008 by Woodell et al., all of which are herein incorporated by reference in their entireties and assigned to the assignee of the present application.

BACKGROUND

Sensor systems are used by aircraft. For example, an aircraft uses an enhanced vision system (EVS) or enhanced flight visions system (EFVS) to provide imagery to an aircraft crew. An EVS uses either a passive or an active sensing system to acquire data used to generate imagery of the runway environment. A conventional passive sensor, such as a forward looking infrared (FLIR) camera or visible light spectrum camera, receives electromagnetic energy from the environment and outputs data that may be used by the system to generate video images from the point of view of the camera. The camera is installed in an appropriate position, such as in the nose of an aircraft, so that the pilot may be presented with an appropriately scaled and positioned video image on the display. However, while passive sensors provide relatively high quality video imagery, the passive sensors are often be unable to identify required visual references in certain low visibility conditions such as heavy fog.

Active sensing systems, such as millimeter wavelength (MMW) radar systems (e.g., 94 GHz), transmit electromagnetic energy into the environment and receive return electromagnetic energy reflected from the environment. The active sensing system is generally installed in an appropriate position, such as in the nose of an aircraft. Active sensing systems are expensive and require space on-board the aircraft that might already be required for other types of equipment. In addition, millimeter wavelength radar systems require expensive radome technology. Additionally, both FLIR cameras and millimeter wavelength radar systems may have limited range in certain low visibility conditions such as heavy fog, rain, or other precipitation.

Thus, there is a need for real time or near real time sensing systems for and methods of providing enhanced vision at longer ranges and in inclement weather. Further, there is a need for real time or near real time sensing systems for and methods of providing enhanced vision imagery that are less expensive and do not require additional space on the aircraft. There is also a need for display systems for and methods of providing images of the external scene using radar data from a weather radar system. There is still a further need for systems for and methods of providing images of the runway environment derived from weather radar data where such images enable operation below certain specified altitudes during instrument approaches. Further still, there is a need for systems and methods that achieve higher resolution imaging using X-band and C-band radar data.

SUMMARY

In one aspect, embodiments of the inventive concepts disclosed herein are directed to an image processing system for enhanced vision including a radar system, a processor and memory coupled to the processor. The memory contains program instructions that, when executed, cause the processor to instruct the radar system to provide radar beams and receive radar returns with improved angular and/or range resolution for deriving image data of the external scene topography.

In a further aspect, embodiments of the inventive concepts disclosed herein are directed to an enhanced vision system including a weather radar system and a display. The weather radar system is configured to generate image data representative of a runway environment associated with radar returns received by the weather radar system. The radar returns are in an X-band or a C-band, and the weather radar system is configured to process a collection of radar measurements from the radar returns. Each of the radar measurements is associated with a location determined from using an antenna position, an antenna attitude, a beam sharpening angle, and a range. The radar measurements are processed to determine power density per grid cell associated with the power and location of the radar measurements, and the power density per grid cell is used to provide an image associated with the power and location of the radar measurements. The display is in communication with the weather radar system and configured to display an image associated with the image data.

In a further aspect, embodiments of the inventive concepts disclosed herein are directed to a weather radar system for an aircraft. The aircraft includes aircraft sensors. The weather radar system includes an antenna and a control circuit configured to provide radar beams via the antenna toward external surroundings and configured to receive radar returns. The control circuit is configured to process a collection of radar measurements from the radar returns. Each of the radar measurements is associated with a location determined using an antenna position which is determined from aircraft sensors, an antenna attitude which is determined from the aircraft attitude sensed by the aircraft sensors combined with antenna boresight relative to the aircraft attitude, a beam sharpening angle, and a range. The radar measurements are processed to determine power density per grid cell associated with the power and location of the radar measurements. The power density per grid cell is used to provide an image associated with the power and location of the radar measurements.

In a further aspect, embodiments of the inventive concepts disclosed herein are directed to a method of providing a real time sensor image on an electronic display. The method includes determining an antenna position, determining an antenna attitude, receiving radar returns from an X-band or C-band airborne weather radar system, and determining a location of each of a plurality of radar measurements associated with the radar returns using an antenna position, an antenna attitude, a beam sharpening angle, and a range. The method also includes determining a power density per grid cell associated with the power and location of the radar measurements. The power density per grid cell is used to provide a real time sensor image on an electronic display.

BRIEF DESCRIPTION OF THE DRAWINGS

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings.

DETAILED DESCRIPTION

Figure 1:
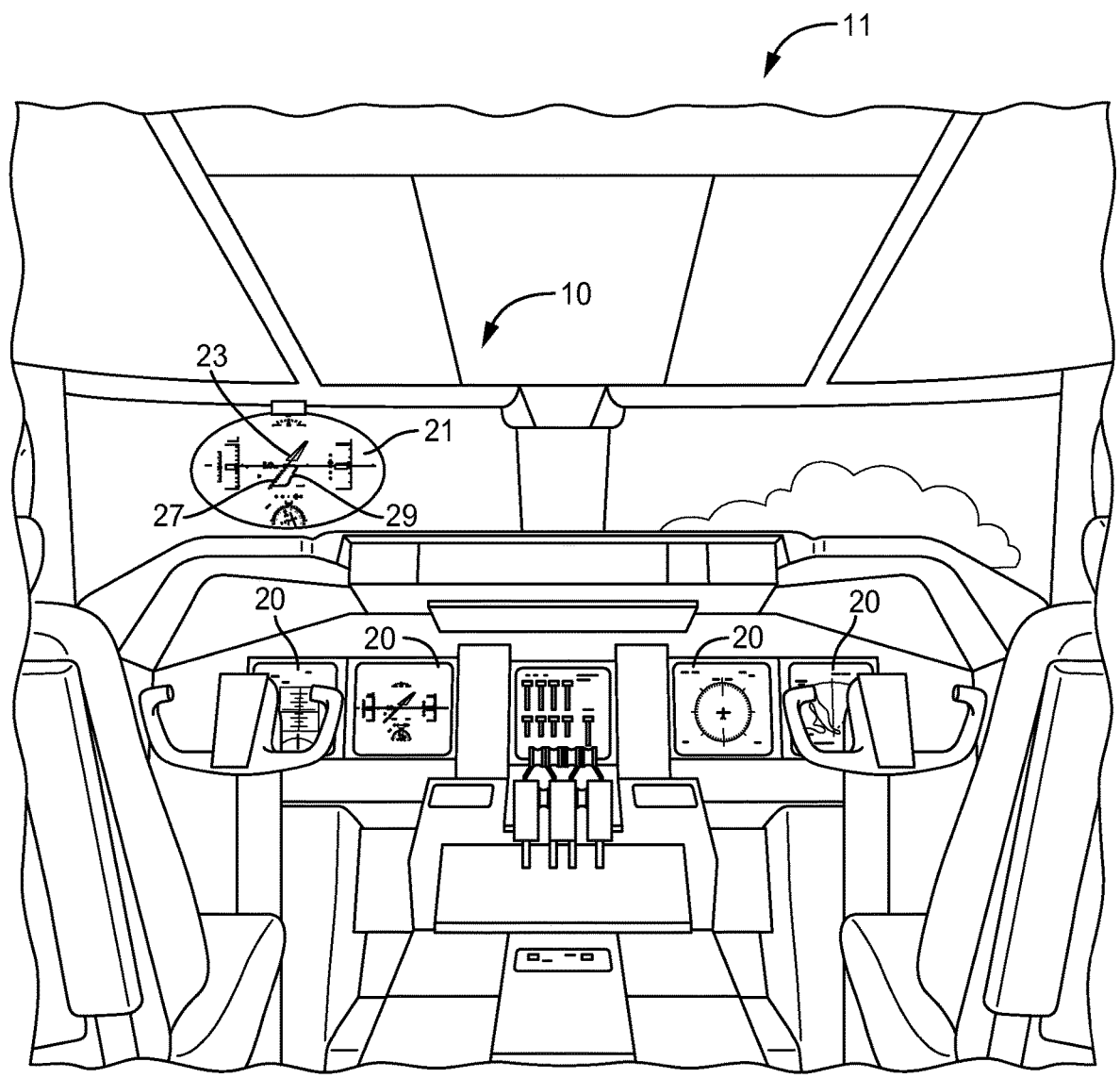
FIG. 1 is a schematic illustration of an aircraft control center or cockpit according to some exemplary embodiments.

Before describing in detail the inventive concepts disclosed herein, it should be observed that the inventive concepts disclosed herein include, but are not limited to, a novel structural combination of data/signal processing components, sensors, and communications circuits, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

According to various exemplary embodiments, an EVS, a sensor system, or a display system can use radar sensing to provide imagery for a pilot or co-pilot of an aircraft display, such as, imagery for a head down display (HDD) or head up display (HUD). For example, the display system may include or use a weather radar system to display an image based upon radar return data. In some embodiments, a Doppler weather radar system may be configured to have enhanced resolution (e.g., angular resolution and/or range resolution). Reflectivity of radar returns from runway structures in an airport terminal or runway environment, such as, an approach lighting system, a threshold lighting system, and or a runway edge lighting system, can be sensed. As will be appreciated, using a weather radar system configured according to the various exemplary embodiments provides greater range than millimeter wavelength radar sensing systems or passive FLIR or visible light camera systems in low visibility conditions, such as, in heavy fog, rain, and snow, given the weather radar system's superior ability to penetrate heavy fog, rain, and snow.

In some embodiments, a weather radar system achieves accurate measurement location using an accurate beam sharpening angle. In some embodiments, the weather radar system creates a two dimensional or three dimensional grid containing power spatial density (PSD) parameters from a collection of radar measurements, each having an individual location and power associated with it. The location of the individual measurement is based on the radar antenna position in some embodiments. From the radar antenna position, the location of the individual measurement is found using the attitude of the antenna, the beam sharpening angle and the range, all specific to that individual measurement in some embodiments. The individual measurements are processed to determine the power spatial density per grid cell associated with the power and location of the individual measurements. The power spatial density per grid cell can be used to generate an image representing the target environment sensed by the radar scan.

Using the weather radar system configured according to the various exemplary embodiments also provides EVS imagery having sufficient accuracy in low visibility conditions (given that many of the visual references required under Title 14 of the Code of Federal Regulations, part 91, such as, approach lighting systems, threshold lighting systems, runway edge lighting systems, and other runway structures, are structures that exhibit high radar reflectivity) in some embodiments. The imagery may allow lower landing minima (e.g., 100 feet or less) in some embodiments. In some embodiments, the lack of radar returns from the runway surface combined with runway structures and lights can provide a suitable image for runway identification by the pilot.

The display system includes a radar processing circuit in communication with the radar system and configured to generate high resolution radar image data of the power spatial density for display in some embodiments. The image data is processed to provide a two-dimensional aircraft situation display (e.g., vertical profile display or plan view display) or three dimensional or perspective aircraft situation display representative of the three dimensional positions of runway structures in an airport terminal or runway environment based on the radar returns as described in U.S. patent application Ser. Nos. 14/301,199, 14/482,681 and 14/536,3300 incorporated herein by reference in their entireties in some embodiments. For example, the radar processing circuit can be embodied as a processor and a non-transitory memory containing program instructions that, when executed, cause the processor to instruct the radar system to provide radar beams and receive radar returns via the antenna and generate image data from the radar returns.

According to certain exemplary embodiments, a radar system, such as, a weather radar system, can be used to sense features of a runway environment. Utilizing the radar cross section associated with runway lighting structures advantageously allows sensing to be achieved whether at day or night, regardless of whether runway lights are on or are off in some embodiments. In one embodiment, the regular, periodic, equal spacing nature of visual aids, such as, approach lighting system, runway edge lights, taxi way lights, and center line lights, can be identified from the image generated from the radar data. In certain embodiments, the systems and methods can be utilized as extension to a combined vision system (CVS).

Referring to FIG. 1, a vision system 10 is provided in an aircraft having an aircraft control center 11 or cockpit. The aircraft control center 11 includes flight displays 20 embodied as head down displays (HDDs). The aircraft control center 11 can also include a combiner 21 association with a head up display (HUD) system. In some embodiments, the combiner 21 is provided as part of a wearable HUD. Conformal images are provided on the combiner 21 in some embodiments.

The flight displays 20 and the combiner 21 can be used to provide information to the flight crew, thereby increasing visual range and enhancing decision-making abilities. In an exemplary embodiment, the flight displays 20 and the combiner 21 can include a weather display, a joint display, a weather radar map and a terrain display. Further, the flight displays 20 may include images from a synthetic vision system (SVS) or an enhanced vision system (EVS) (e.g., an EFVS). For example, the flight displays 20 can include a display configured to display a perspective image of terrain and/or weather information. Other views of terrain and/or weather information may also be provided (e.g., plan view, horizontal view, vertical view, or combinations thereof). Additionally, the flight displays 20 can be implemented using any of a variety of display technologies, including CRT, LCD, organic LED, dot matrix display, and others.

According to some embodiments, the vision system 10 is configured to provide an image based upon radar data to at least one of the displays 20 or the combiner 21. In FIG. 1, the image on the combiner 21 includes a runway 23 or features 29 associated with the runway 23 as viewed from the aircraft (e.g., during approach and/or landing). In some embodiments, at least one of the displays 20 or the combiner 21 displays a merged image of terrain derived from two or more of enhanced vision data, radar data, and SVS data. Advantageously, real time radar data can be provided to provide a real time, all weather detection of the runway features 29 associated with the runway 23 in one embodiment. Advantageously, the radar data allows the runway 23 and its orientation and an extended centerline 27 to be viewed by one or more pilots in challenging weather conditions in some embodiments.

Figure 2:
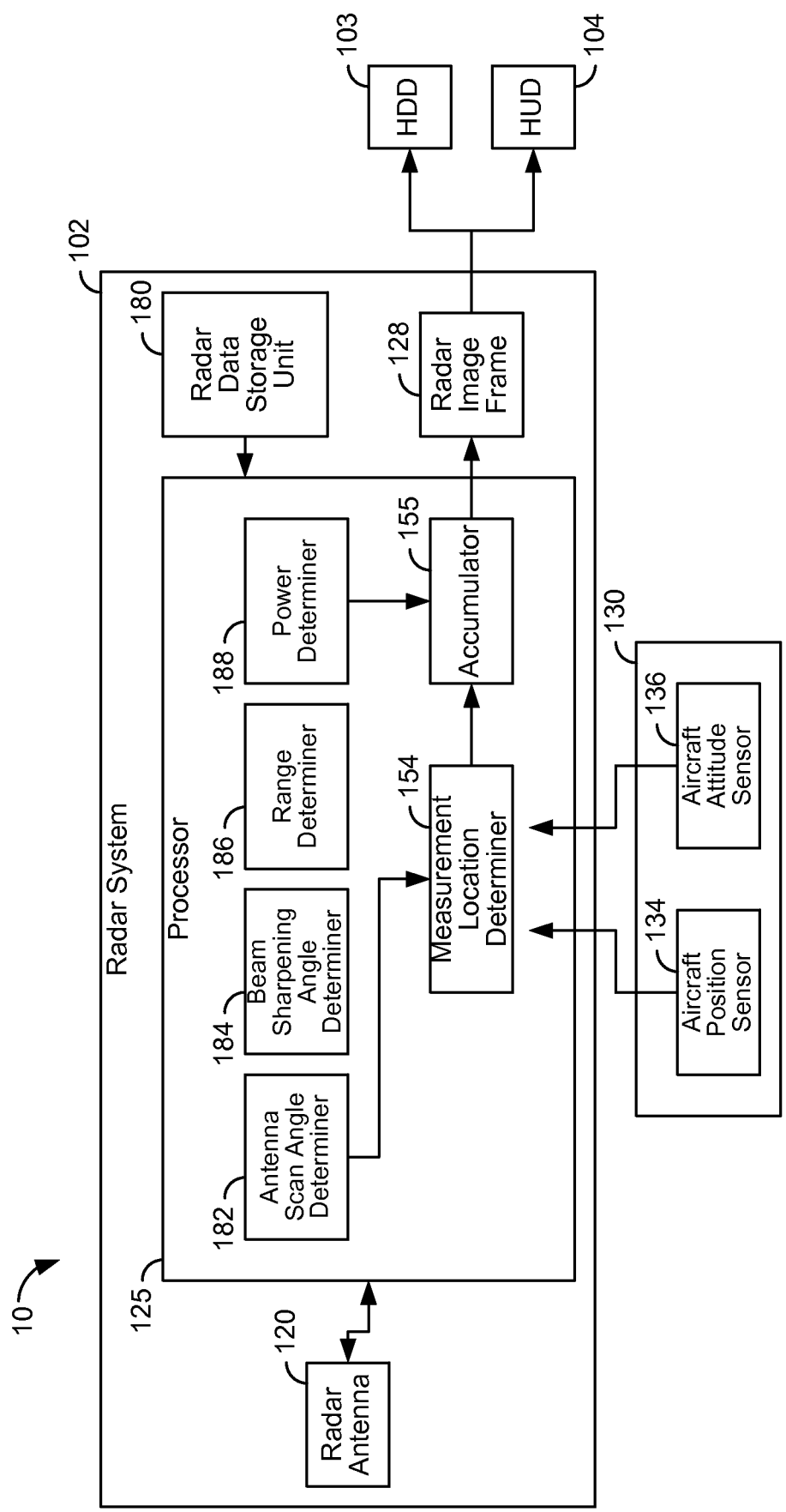
FIG. 2 is a schematic general block diagram of a display system for displaying an image derived from radar data, according to some exemplary embodiments.

Referring to FIG. 2, the vision system 10 uses radar data from a radar system 102 to provide an image to any of the displays 20 (FIG. 1) via a HDD computer 103 or the combiner 21 (FIG. 1) via a HUD computer 104 in some embodiments. The vision system 10 is in communication with or includes the radar system 102 and can include or be in communication with an SVS and/or an EVS in some embodiments. The EVS and the SVS are optional in some embodiments.

The vision system 10 is in communication with aircraft sensors 130. The aircraft sensors 130 are associated with navigation equipment and flight control devices in some embodiments and can include an inertial navigation system, flight computer, barometric altimeter, radar altimeter, global positioning system (GPS) receiver, air speed sensors, heading sensors, etc.) The aircraft sensors 130 include an aircraft position sensor 134 and an aircraft attitude sensor 136.

The aircraft positon sensor 134 is any device or system for providing an electronic signal or data representing aircraft positon. In some embodiments, the aircraft position includes a position parameter (e.g., latitude and longitude) and an aircraft altitude parameter. The aircraft position sensor 134 is a GPS receiver or inertial navigation system in some embodiments. The aircraft altitude can be provided by a GPS receiver, an altitude sensor (e.g., barometric sensor), an inertial navigation system, or other device. In some embodiments, the aircraft positon also includes velocity and acceleration parameters associated with aircraft positon (e.g., for predicting future positon of the aircraft).

The aircraft attitude sensor 136 is any device for providing an electronic signal or data representing attitude of the aircraft. The aircraft attitude includes a heading parameter, a pitch parameter, a yaw parameter, and a roll parameter in some embodiments. In some embodiments, the aircraft positon sensor 134 and the aircraft attitude sensor 138 are parts of a single positioning or navigation sensor system, such as a GPS receiver or inertial navigation system. In some embodiments, the aircraft attitude also includes velocity and acceleration parameters associated with attitude (e.g., for predicting future attitude position of the aircraft).

The radar system 102 receives data from the aircraft sensors 130 and provides image data for display by vision system 10. The radar system 102 is a weather radar system generally located inside the nose of the aircraft, inside a cockpit of the aircraft, on the top of the aircraft or on the tail of the aircraft in some embodiments. The radar system 102 includes a radar antenna 120, a processor 125, a radar data storage unit 180, and an image frame memory 128. The radar system 102 can be a weather radar system, such as, a Multiscan™ radar system from Rockwell Collins, Inc. configured as described herein. The radar system 102 can utilize a split, half or sub-aperture or other technique for obtaining radar data associated with external surroundings in some embodiments. The radar system 102 can use the split or sub-aperture techniques of the radar systems described in U.S. application Ser. Nos. 13/627,788, 12/892,563, 13/250, 798, 12/236,464, and 12/167,200 and U.S. Pat. No. 8,077, 078, incorporated herein by reference and assigned to the assignee of the present application. The type of the radar system 102 and data gathering techniques are not discussed in the specification in a limiting fashion.

The processor 125 uses radar data stored in the radar data storage unit 180 and the data from the aircraft sensors 130 to store image data in the image frame memory 128. The processor 125 includes a measurement location determiner 154, an accumulator 155, an antenna scan angle determiner 182, a beam sharpening angle determiner 184, a range determiner 186, and a power determiner 188. The accumulator 155, the measurement location determiner 154, the radar data storage unit 180, the antenna scan angle determiner 182, the beam sharpening angle determiner 184, the range determiner 186, and the power determiner 188 are software modules, circuits, or combinations thereof in some embodiments.

The measurement location determiner 154 uses data from the aircraft sensors 130 and from the radar data storage unit 180, the antenna scan angle determiner 182, the beam sharpening angle determiner 184, and the range determiner 186 to identify a location for individualized measurements associated with returns received at the radar antenna 120 in some embodiments. The data associated with the radar returns are stored in the radar data storage unit 180 in some embodiments. The measurement location determiner 154 uses the position of the radar antenna 120, the position and attitude of the aircraft, the antenna pointing angle, the beam sharpening angle, and the range to determine the location of individualized measurements in some embodiments. Each individualized measurement is accumulated in the accumulator 155 by location in some embodiments. The power determiner 188 is tallied for a return power of the individualized measurements by the accumulator 155 for each return on a location basis in some embodiments.

The processor 125 causes the radar antenna 120 to provide radar signals or beams and to receive radar returns (e.g., weather radar returns data). The processor 125 is an electronic processor that processes the radar returns and provides the radar data to the radar data storage unit 180. The radar signals and radar returns are in the X-band or C-band in some embodiments.

The radar system 102 provides the radar data (e.g., weather radar return data) to the storage unit 180 in one embodiment. The radar data can be processed and filtered for various weather sensing functions as well as measurement location functions. In some embodiments, the processor 125 provides an image frame or image data for storage in the image frame memory 128 using the accumulated individualized returns in accumulator 155. In some embodiments, the accumulator 155 determines power spatial density by grid cell to create the image frame.

The image frame memory 128 is a video or graphic electronic memory in some embodiments. In some embodiments, the image frame memory 128 is a regular electronic memory. The accumulator 155 is an electronic memory, processor circuitry, or combination thereof in some embodiments. In some embodiments, accumulator 155 is part of a digital signal processor or the processor 125 or is a software module executing on the digital signal processor or the processor 125. The accumulator 155 is embodied as a register in some embodiments. The data storage unit 180 is an electronic memory in some embodiments.

The radar data associated with the external surroundings can represent sensed targets and the location of the sensed targets. Targets include terrain, man-made features, objects, runways, etc. Improved angular resolution and range resolution techniques discussed in U.S. patent application Ser. No. 14/536,330 filed Nov. 7, 2014 by Jinkins et al. incorporated herein by reference in its entirety allows the location of the targets to be more accurately determined and represented in image data in some embodiments. The radar system 102 can utilize clutter suppression and Doppler filtering to improve performance in some embodiments.

In some embodiments, the radar system 102 provides data representing a 120 degree field of view in accordance with a weather radar sweep. The sweep can be limited during approach to be a 30 degree sweep in certain embodiments. The sweep is directed toward the surface of the Earth so that returns are obtained which allow runway environment features to be sensed. Various types of sweeps, sweep patterns, and sweep speeds can be utilized without departing from the scope of the invention.

The radar system 102 embodied as a weather radar allows existing avionic equipment to be used as a real-time sensor for providing a radar-derived enhanced image of the external scene topography to the pilot in some embodiments. The image or representation generated by the radar system 102 is provided on the displays 20 (FIG. 1) or the combiner 21 can function as an EVS to provide situation awareness to the pilot in some embodiments. In other embodiments, the image or representation generated by the radar system 102 is provided on the displays 20 or the combiner 21 can function as an EFVS to allow lower landing minima.

The radar system 102 advantageously provides increased range resolution in some embodiments. The radar system 102 also provides increased angle resolution in some embodiments. The increased resolution in range and angle allows a higher resolution for measurement location by the measurement location determiner 154 and hence higher image resolution to be provided on the displays 20 and the combiner 21 in some embodiments.

According to some embodiments, the radar system 102 can use a beam sharpening method to achieve increased angular resolution. In some embodiments, the radar system 102 can utilize techniques such as beam sharpening (e.g., horizontal beam sharpening) and de-convolution of the beam point spread function for improved angular resolution. In some embodiments, the radar system 102 can use beam sharpening as a process that improves the antenna-induced poor angular resolution (e.g., due to the beam width). There are many methods that can be used such as: Monopulse Radar, Sub-Aperture Radar or Split-Aperture Radar, etc. Mathematical methods can be utilized to determine a center of the radar echo for identifying runway features. Techniques for beam sharpening and determining beam sharpening angles and scan angles are discussed in U.S. patent application Ser. Nos. 13/627,788, 12/892,563, 13/250,798, 12/236,464, and 12/167,200 and U.S. Pat. No. 8,077,078 incorporated herein by reference in their entireties.

The radar system 102 uses the radar antenna 120 that toggles between transmitting and receiving on the full aperture and transmitting on the full aperture while receiving on the partial aperture in some embodiments. These techniques can be used to accurately estimate at which angle the measurement was located within the radar beam. The received returns can be processed to determine a high resolution estimate of a measurement angle relative to the boresight of the antenna beam. According to some embodiments, the returns can be processed using a complex conjugate multiplication method to determine the measurement angle. The processing can be related to sequential lobing processing but is executed in the phase domain as opposed to the common amplitude domain in some embodiments.

In some embodiments, the radar system 102 uses sequential lobing techniques where two antennas that are close to the same place may be used, going back and forth between the two antennas. An amplitude signature or phase signature that varies between the two halves of the antennas may be used to obtain data about target position for sensed targets (e.g., an object such as other aircraft, terrain, or towers). Sequential lobing generally does not use phase comparisons with moving targets due to Doppler-induced phase changes that contaminate the phase center measurement. However, using a complex conjugate multiply method allows the Doppler-induced phase changes to be removed by cancellation. Therefore, a change in phase center between multiple different sub-apertures may be determined and used to determine the angle to measurement of the target.

In some embodiments, the effective waveform bandwidth of the radar system 102 is increased to increase range resolution. The radar system 102 can use stepped-frequency compression in some embodiments. To provide higher range resolution, the radar system 102 provides ultra-wideband radar (UWB) pulses (e.g., extremely narrow pulses with high power), or provides intra pulse compression (frequency of phase modulation of the transmitted pulse) in some embodiments. Frequency coding techniques including the common linear frequency modulation (LFM) or chirp method, and discrete coded segments within the pulse can be utilized in some embodiments. Phase coding techniques including binary phase codes as well as various polyphase codes can be utilized in some embodiments. To provide higher range resolution, the radar system 102 provides interpulse pulse compression or stepped frequency compression (e.g., successive pulses with discrete increasing frequency steps) in some embodiments. In some embodiments, stepped frequency compression advantageously achieves high effective bandwidth with narrow instantaneous bandwidth. The receive bandwidth is smaller, has lower noise bandwidth, and a higher signal to noise ratio in some embodiments. Analog-to-digital sampling rates are lower (vs. pulse-compression) in some embodiments. In addition, the stepped frequency compression also has a smaller peak power (e.g., when compared to impulse), provides flexible transmit frequency control, can "hop" over restricted or undesired transmit frequencies, enables adaptive/cognitive frequency use, and rejects later received clutter from earlier transmit pulses in some embodiments. Further, the stepped frequency compression provides returns from clutter in ambiguous ranges that have frequencies that are different from returns from targets and rejects ambiguous clutter returns in the receiver IF filter of the radar system 102 in some embodiments. Stepped frequency compression generally does not achieve range resolution with a single pulse, requires transmit, receive and processing of a group of pulses for any one bin, and has more pronounced range-Doppler coupling (e.g., different Doppler shifts for each frequency) in some embodiments.

The processor 125 can be any hardware and/or software processor or processing architecture capable of executing instructions and operating on navigational and radar data. The processor 125 can be capable of determining navigational information such as altitude, heading, bearing, and location based on data from the aircraft sensors 130. The processor 125 can be, or can include one or more microprocessors, an application specific integrated circuit (ASIC), a circuit containing one or more processing components, a group of distributed processing components, circuitry for supporting a microprocessor, or other hardware configured for processing.

Figure 3:
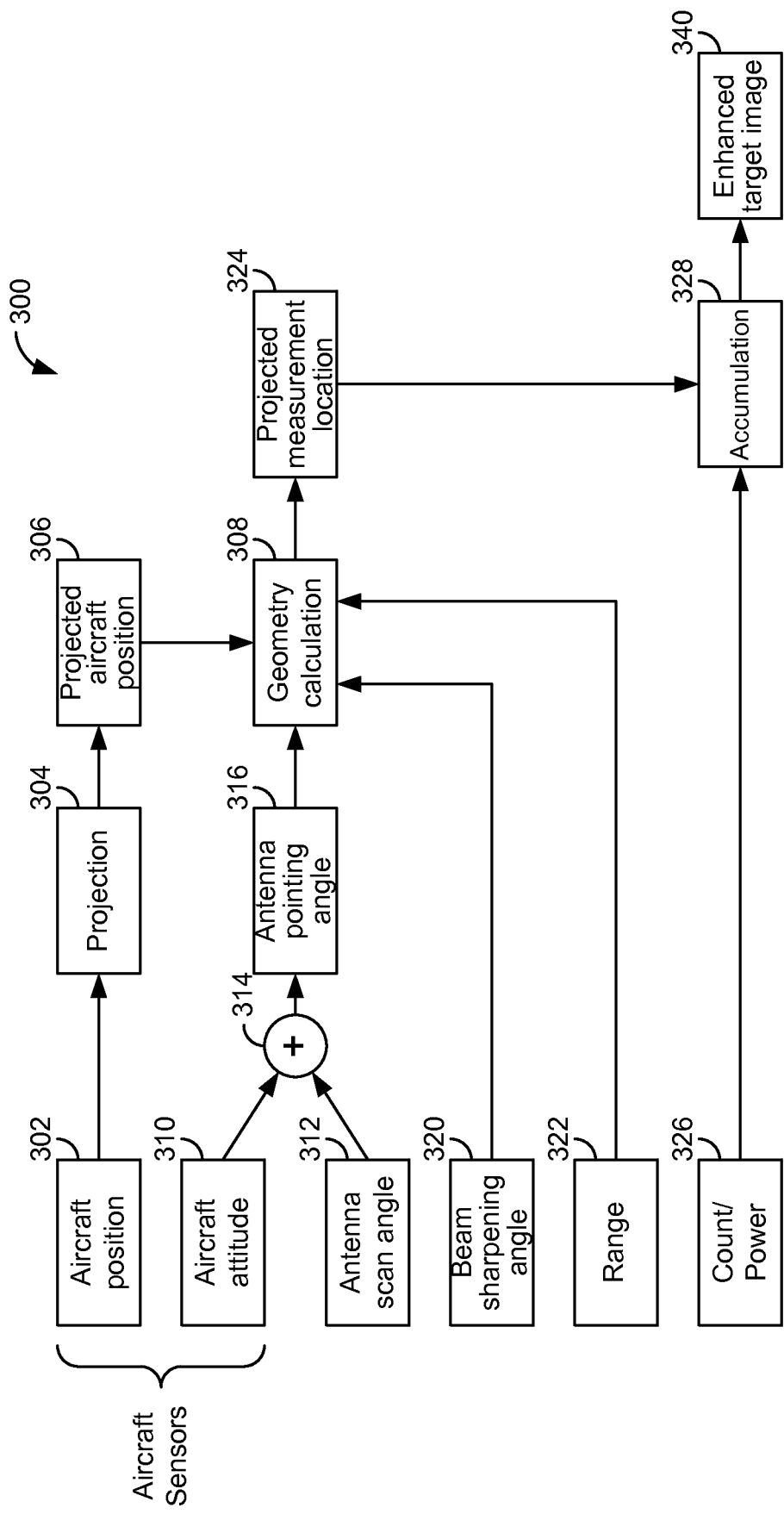
FIG. 3 is a flow diagram showing an operational flow used by the display system illustrated in FIG. 2 to determine the measurement locations and accumulate returned measurements from the target environment, according to a further exemplary embodiment of the inventive concepts disclosed herein.

With reference to FIG. 3, a flow 300 can be performed by the vision system 10 in some embodiments. The processor 125 or other computing platform can execute flow 300 to provide an image in response to aircraft sensor parameters and radar data. The aircraft sensor parameters and radar data are processed to provide individualized measurements at locations which have a reflected power. The individualized measurements are further processed on a location basis to determine the power spatial density which is used to provide the image data for an enhanced target image 340. The flow 300 is used to create a two dimensional image (e.g., the enhanced radar image 340) of the power spatial density from a collection of radar measurements that each have an individual location and power associated to that measurement in some embodiments. The individualized measurements are located and accumulated to determine a power spatial density on a grid basis to create the image (e.g., the enhanced radar image 340).

The radar system 102 uses an aircraft position parameter 302 from the aircraft sensors 130 to perform a projection operation 304 to project a local aircraft position and provide a projected aircraft position parameter 306 in some embodiments. The aircraft positon parameter 302 includes positon (e.g., altitude, latitude and longitude) in some embodiments. The projected aircraft positon parameter includes position parameters but projected to a local axis system in some embodiments.

The radar system 102 uses an aircraft attitude parameter 310 from the aircraft sensors 130 to perform a combination operation 314 with an antenna scan angle parameter 312 from the radar system 102. The combination operation 314 provides an antenna pointing angle parameter 316 associated of the radar antenna 120 in some embodiments. The attitude parameter 310 includes heading in some embodiments. In some other embodiments, the attitude parameter 310 could also include yaw, pitch, and roll.

The radar system 102 uses a beam sharpening angle parameter 320, the antenna pointing angle parameter 316, the range parameter 322 and the projected aircraft positon parameter 306 to provide a projected measurement location parameter 324 in a geometry calculation operation 305 in some embodiments. The projected measurement location parameter 324 is a location of an individualized measurement associated with a radar return in some embodiments. In some embodiments, the location of the individual measurement is determined using the position of the radar antenna 120 (e.g., the antenna pointing angle parameter 312), the heading of the aircraft, the position of the aircraft (e.g., the projected position parameter 306), the range parameter 322, and the beam sharpening angle parameter 320, all specific to the individualized measurement.

The heading from the aircraft attitude sensor 310 is the direction of the longitudinal axis of the aircraft with respect to North in some embodiments. The antenna scan angle parameter 312 represents the direction of the boresight of the radar antenna 120 with respect to the heading of the aircraft in some embodiments. The beam sharpening angle parameter 320 represents the radar sensed direction of the returned reflection of the individual measurement with respect to the boresight of the radar antenna 120 in some embodiments. The range parameter 322 is the ground range (e.g., the radar sensed distance between the radar antenna 120 and the returned reflection of the individual measurement projected onto a flat ground surface) in some embodiments. Ground range can be calculated using the Pythagorean theorem by taking a slant range that is sensed by the radar system corrected with the difference in altitude between the radar antenna 120 and returned reflection of the individual measurement in some embodiments. The altitude of the radar antenna 120 can be obtained from the aircraft sensors 130 in some embodiments. There are multiple ways to obtain the altitude of the returned reflection of the individual measurement in some embodiments including using the radar antenna altitude, antenna tilt angle, vertical beam sharpening angle and slant range similar to the horizontal calculation discussed above in some embodiments. The antenna tilt angle is the direction of the vertical boresight of the radar antenna 120 with respect to the horizon in some embodiments. The vertical beam sharpening angle is the radar sensed vertical direction of the returned reflection of the individual measurement with respect to the vertical boresight of the radar antenna 120 in some embodiments. The altitude of the reflection can also be assumed to be coming from an altitude that can be approximated be the surveyed runway threshold altitude, since the observed approach lights are normally located level with the runway threshold in some embodiments. The parameters and their representations discussed in this paragraph are exemplary only.

An accumulation operation 328 accumulates return measurements based on the locations of the individualized measurements in the accumulator 155. The accumulation includes power parameter 326 in some embodiments. The power can be sensed as a decibel (dB) value of electromagnetic energy received at the radar antenna 120. All individualized measurements have a location and reflected power value.

The data accumulated in the accumulation operation 328 is used to provide an enhanced target image 340 for provision in the radar image frame 128 in some embodiments. The enhanced target image 340 is provided on the display 20 (FIG. 1) via the HDD computer 103 (FIG. 2) and the combiner 21 via the HUD computer 104 in some embodiments. The data accumulated in the accumulation operation 328 represents spatial power density on a grid basis in some embodiments.

Figure 4:
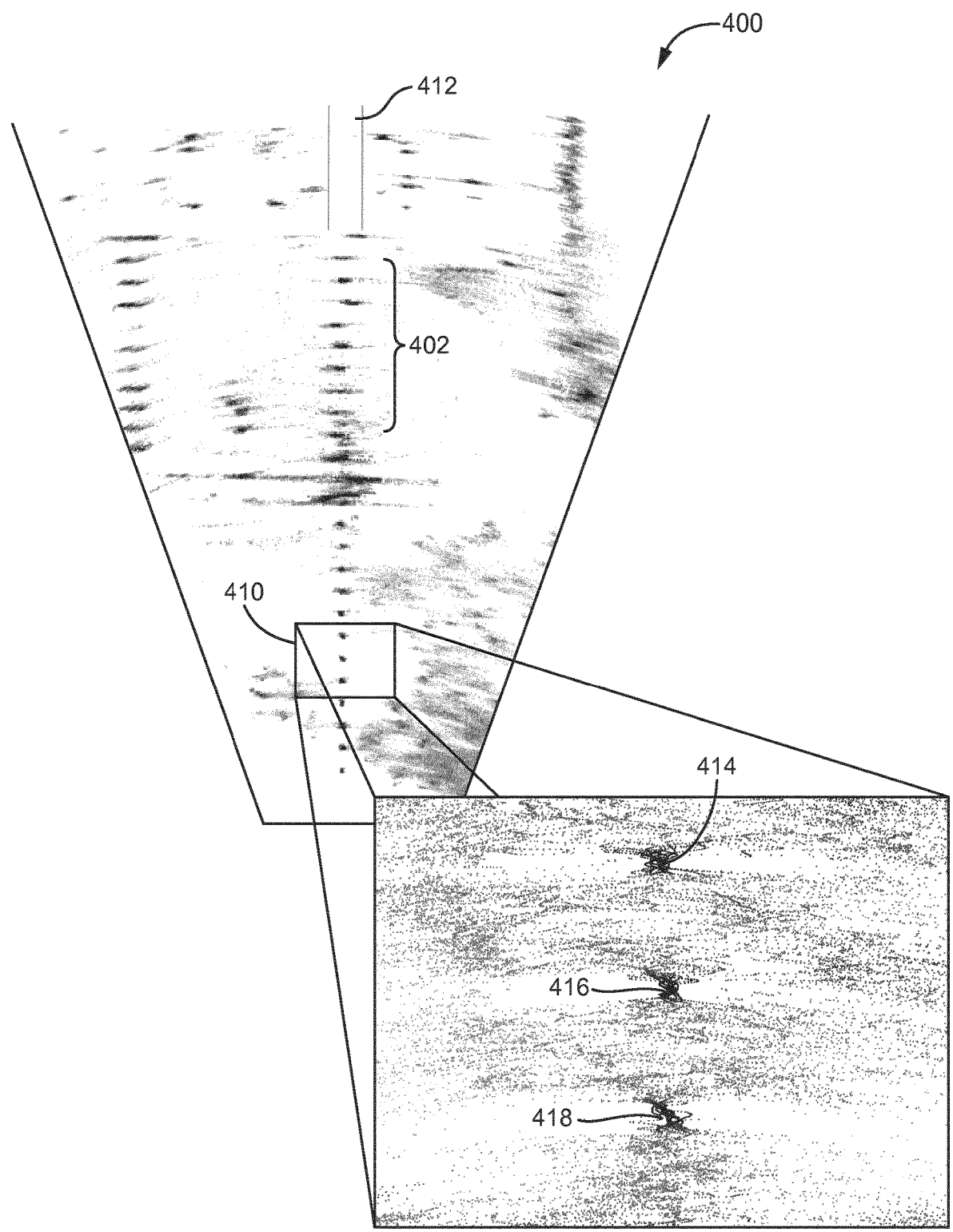
FIG. 4 is an illustration of an image derived from radar data provided by the display system illustrated in FIG. 2, wherein individualized measurements are represented by dot representations, according to yet another exemplary embodiment of the inventive concepts disclosed herein.

With reference to FIG. 4, an image 400 of the external scene topography derived from the radar data associated with the returns or measurements includes features 402 associated with runway approach lights of a runway 412. An absence of return energy is associated with the runway 412 in some embodiments.

A portion 410 of the image 400 shows features 414, 416, and 418 associated with runway lights. In some embodiments, the individualized measurements are represented by dots in the image 410. The grey level of each dot represents the reflected power level of the individualized measurements. The darkness and size of features 414, 416, and 418 indicates presence of a large number of strong individualized measurements, such as measurements associated with reflections from approach lights.

Figure 5:
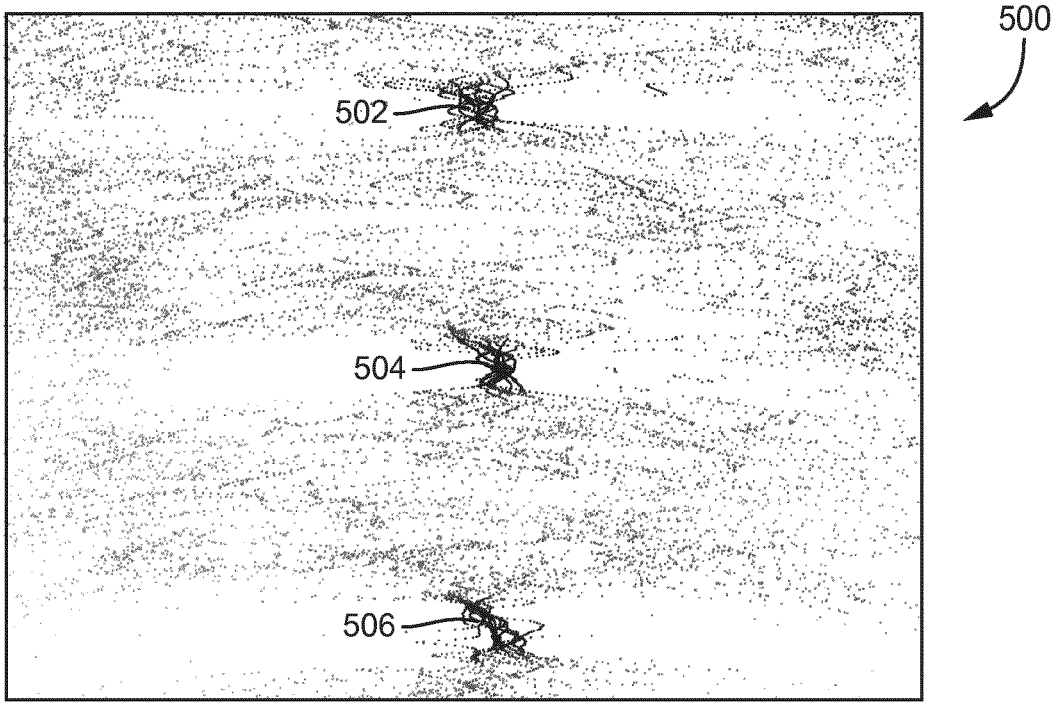
FIG. 5 is an illustration of an image derived from the radar data associated with the image illustrated in FIG. 4, wherein individualized measurements are represented by dot representations, according to yet another exemplary embodiment of the inventive concepts disclosed herein.

With reference to FIG. 5, an image 500 similar to the portion 410, is derived from the radar data associated with the returns or measurements. The image 500 includes features 502, 504, and 506 associated with features 414, 416, and 418 (FIG. 4).

Figure 6:
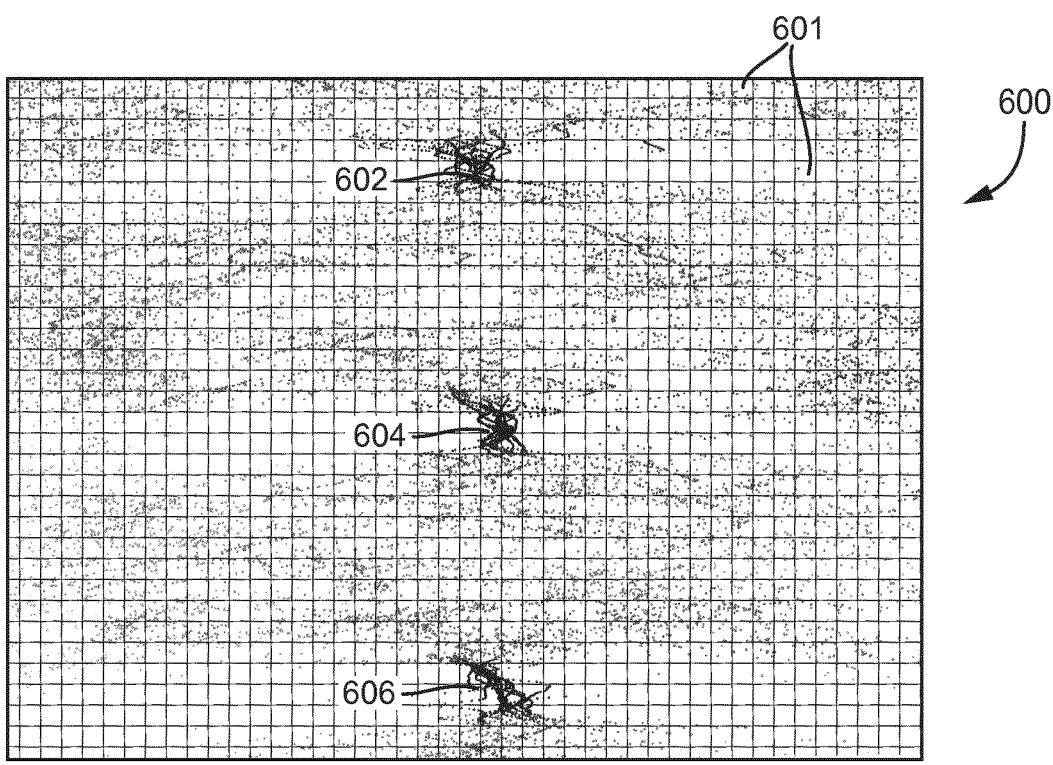
FIG. 6 is an illustration of an image derived from the radar data associated with the image illustrated in FIG. 5, wherein the individualized measurements represented by the dot representations are provided over Cartesian grid cells, according to yet another exemplary embodiment of the inventive concepts disclosed herein.

With reference to FIG. 6, an image 600 similar to the image 500 derived from the radar data associated with the radar returns or measurements is provided over a Cartesian grid with grid cells 601. The image 600 includes features 602, 604, and 606 associated with the features 502, 504, and 506 (FIG. 5). The grid cells 601 can be sized to represent a particular area or volume. For example, the grid cells 601 can represent a 10 square foot area or a 10 cubic foot volume. Various dimensions can be used for the grid cells 601. The grid cells 601 can be other shapes and be part of a non-Cartesian grid in some embodiments The features 602, 604, and 606 fill a relatively large portion of the grid cells 601 associated with their locations. All of the individual measurements can be accumulated per each of the grid cells 601. Within one grid cell 601, the powers of the individual measurements are added together. Based on the area of the grid cell 601, the power per area is calculated to provide the power spatial density on a grid basis in some embodiments.

Figure 7:
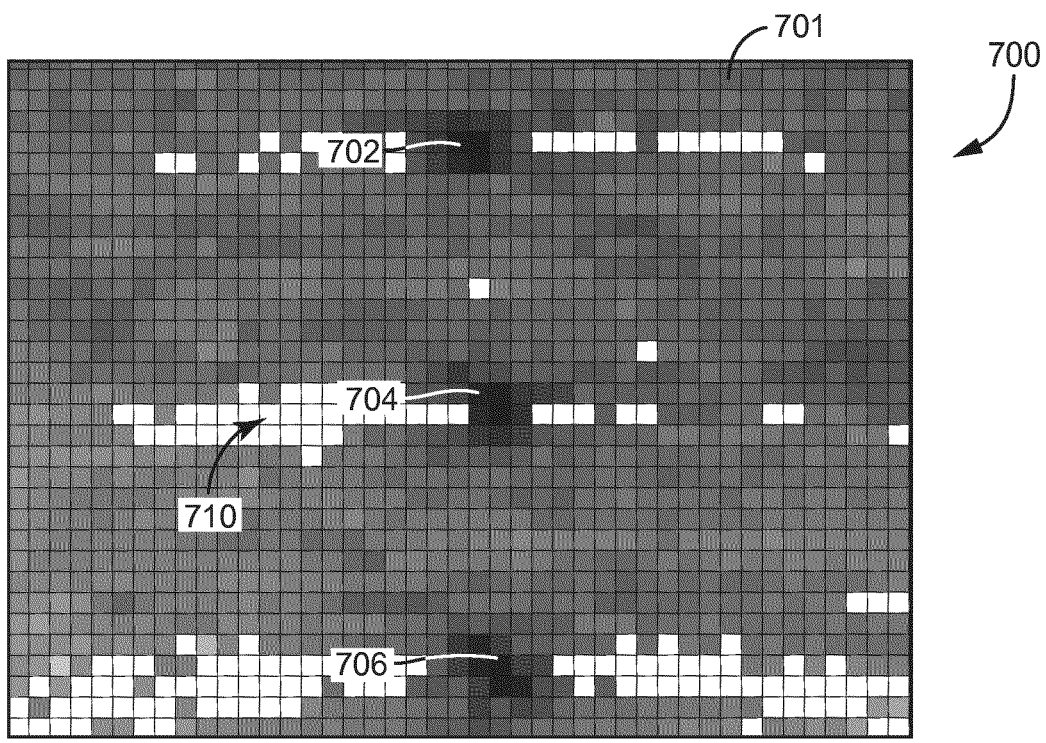
FIG. 7 is an illustration of an image derived from the radar data associated with the image illustrated in FIG. 5, wherein the individualized measurements are represented by power spatial density for the Cartesian grid cells according to yet another exemplary embodiment of the inventive concepts disclosed herein.

With reference to FIG. 7, an image 700 similar to the image 600 derived from the radar data associated with the radar returns or measurements shows power spatial density in each of grid cells 701 which are similar to grid cells 601. The power spatial density in each grid cell 701 is represented by a grey level. The image 700 includes features 702, 704, and 706 associated with the features 602, 604, and 606 (FIG. 6). The grid cells 710 are white representing very low power or no individual measurements in the grid cells 701 while grid cells 702, 704, and 706 associated with the features 602, 604, and 606 are black representing the highest power spatial density level or levels. The features 702, 704, and 706 appear as one or more grid cells 701 that are darker than neighboring grid cells 701. In some embodiments, visualization of high power spatial density areas is of main interest so the intensity range for grey levels for the power spatial density are adjusted such the lower power spatial density levels are white and gray levels start at higher power spatial density levels.

Figure 8:
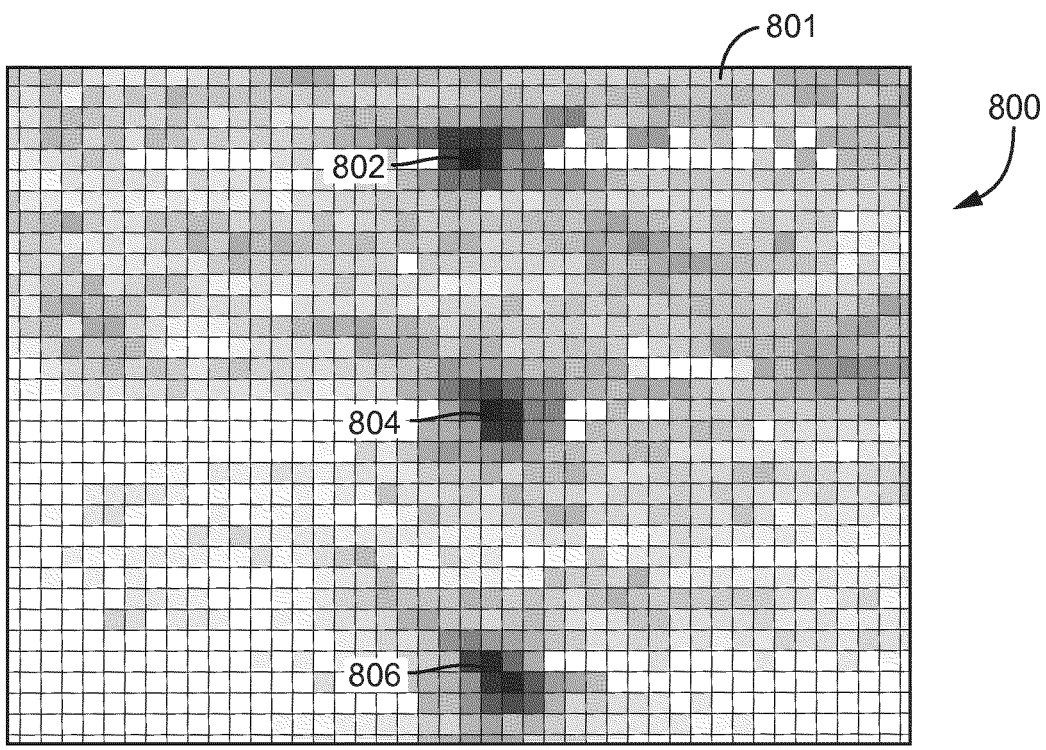
FIG. 8 is an illustration of an image derived from the radar data associated with the image illustrated in FIG. 5, wherein the individualized measurements are represented in a revised gray scale for the power spatial density for the Cartesian grid cells, according to yet another exemplary embodiment of the inventive concepts disclosed herein.

With reference to FIG. 8, an image 800 similar to the image 700 derived from the radar data associated with the radar returns or measurements shows power spatial density in each of grid cells 801 which are similar to grid cells 701. The power spatial density in each grid cell 801 is represented by a grey level. The image 800 includes features 802, 804, and 806 associated with the features 702, 704, and 706 (FIG. 7). The intensity range for grey levels for the power spatial density is adjusted using filtering or other image darkness adjustment techniques such that the lower power spatial density levels are white and gray levels start at higher power spatial density levels. For example, power spatial density thresholds for each grey level can be adjusted to emphasize higher power spatial density cells 801 over medium to lower power spatial density grid cells 801 in some embodiments. A threshold table or map can be used to store such thresholds. The threshold table can be adjusted via a user interface in some embodiments. Filtering can be used to reduce fluctuations in the power spatial density in some embodiments.

Figure 9:
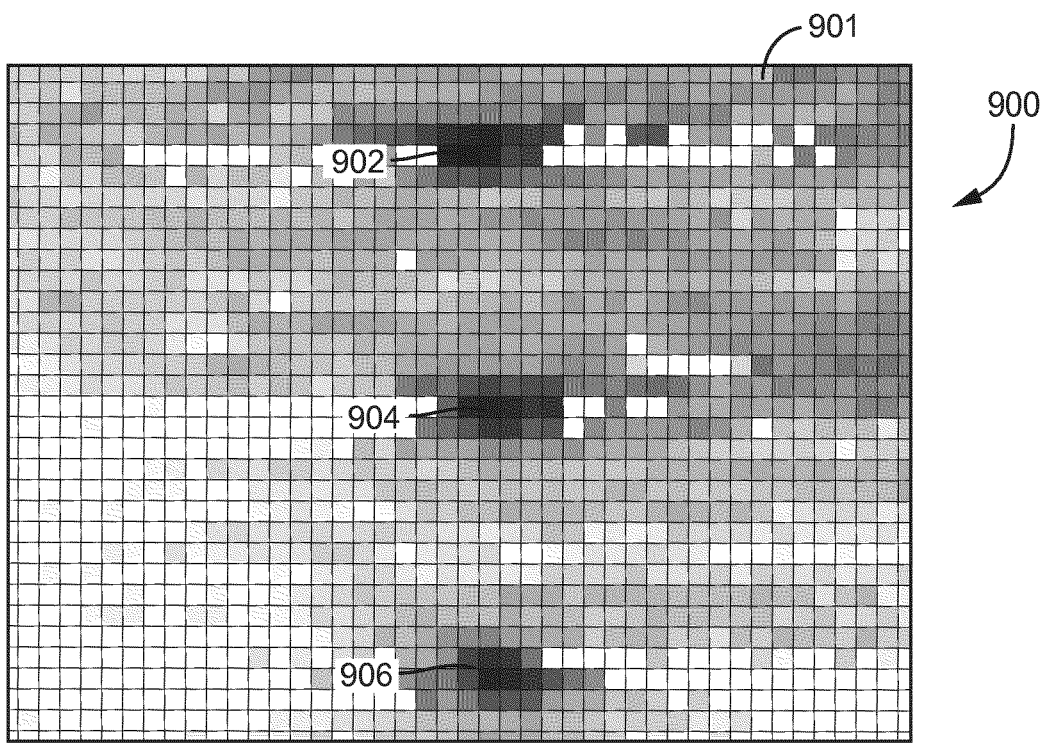
FIG. 9 is an illustration of an image derived from the radar data associated with the image illustrated in FIG. 5, wherein individualized measurements are represented in filtered power spatial density for the Cartesian grid cells according to yet another exemplary embodiment of the inventive concepts disclosed herein.

With reference to FIG. 9, an image 900 similar to the image 800 derived from the radar data associated with the radar returns or measurements shows power spatial density over grid cells 901 which are similar to grid cells 801. The image 900 is a result of spatial filtering of the image 800 to reduce fluctuations in the power spatial density in some embodiments. The image 900 appears less noisy in some embodiments. Digital spatial filtering can be utilized. The image 900 is an effective visualization of power spatial density despite spatial filtering.

Figure 10:
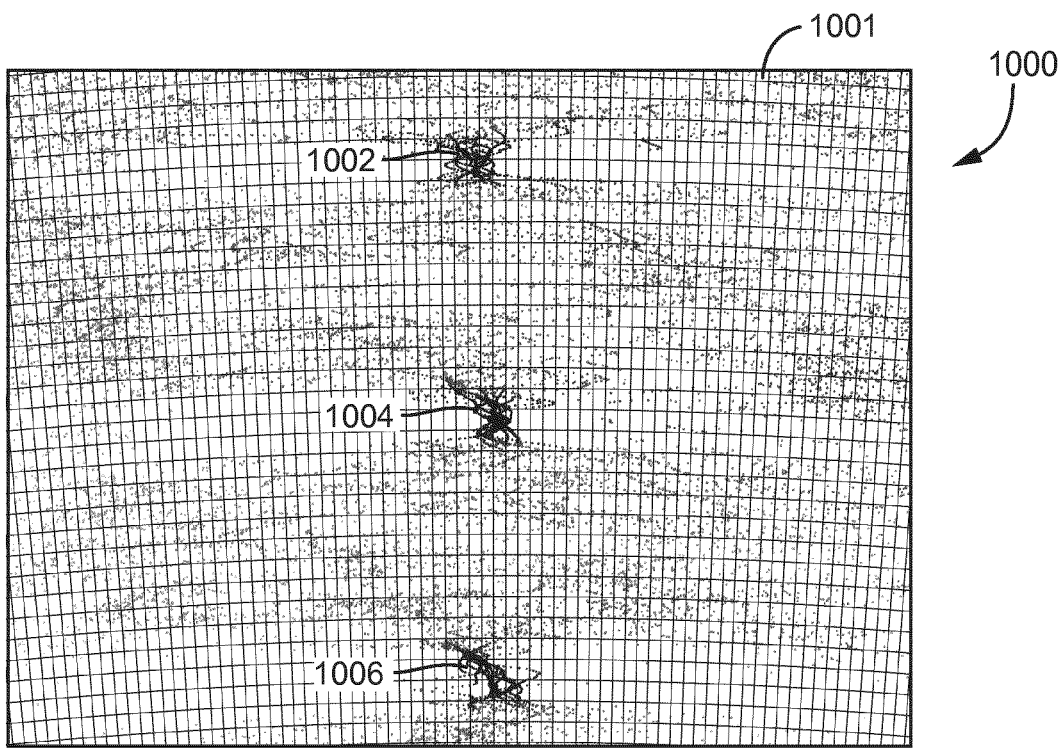
FIG. 10 is an illustration of an image derived from the radar data associated with the image illustrated in FIG. 5, wherein the individualized measurements represented by the dot representations are provided over polar grid cells, according to yet another exemplary embodiment of the inventive concepts disclosed herein.

With reference to FIG. 10, an image 1000 similar to the image 500 derived from the radar data associated with the storage unit 180 is provided over a polar grid with grid cells 1001. The grid cells 1001 can be sized to represent a particular area associated with features 1002, 1004, and 1006 which are associated with the features 414, 416, and 418 (FIG. 4). For example, the grid cells 1001 can represent a particular area or a volume. Various dimensions can be used for the grid cells 1001. The grid cells 1001 can be other shapes and be part of a non-polar grid in some embodiments With reference to FIG. 11, an image 1100 similar to the image 1000 derived from the radar data associated with the radar returns or measurements shows power spatial density in each of grid cells 1101 which are similar to grid cells 1001. The power spatial density in each grid cell 1101 is represented by a grey level. The image 1100 includes features 1102, 1104, and 1106 associated with features 1002, 1004, and 1006. The features 1102, 1104, and 1106 appear as one or more grid cells 1101 that are darker than neighboring gird cells 1101. The intensity range for grey levels for the power spatial density are adjusted using filtering or other image darkness adjustment techniques such that the lower power spatial density levels are white and gray levels start at higher power spatial density levels.

Figure 11:
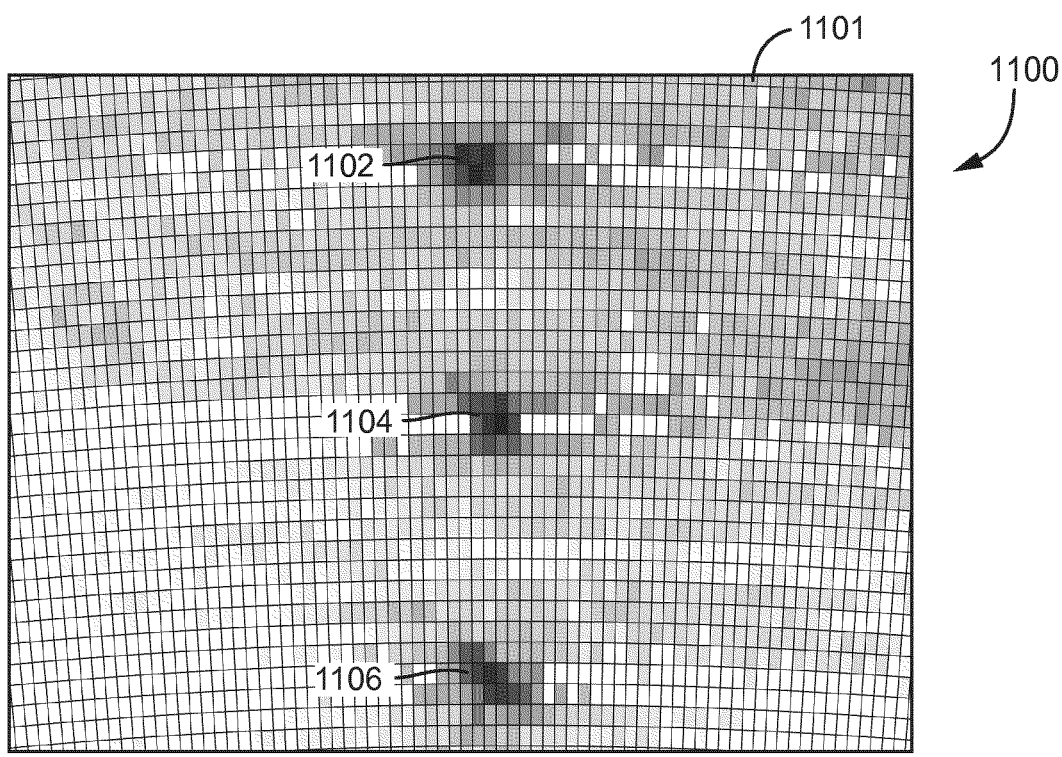
FIG. 11 is an illustration of an image derived from the radar data associated with the image illustrated in FIG. 5, wherein the individualized measurements are represented in a revised gray scale for the power spatial density for the polar grid cells, according to yet another exemplary embodiment of the inventive concepts disclosed herein.
Figure 12:
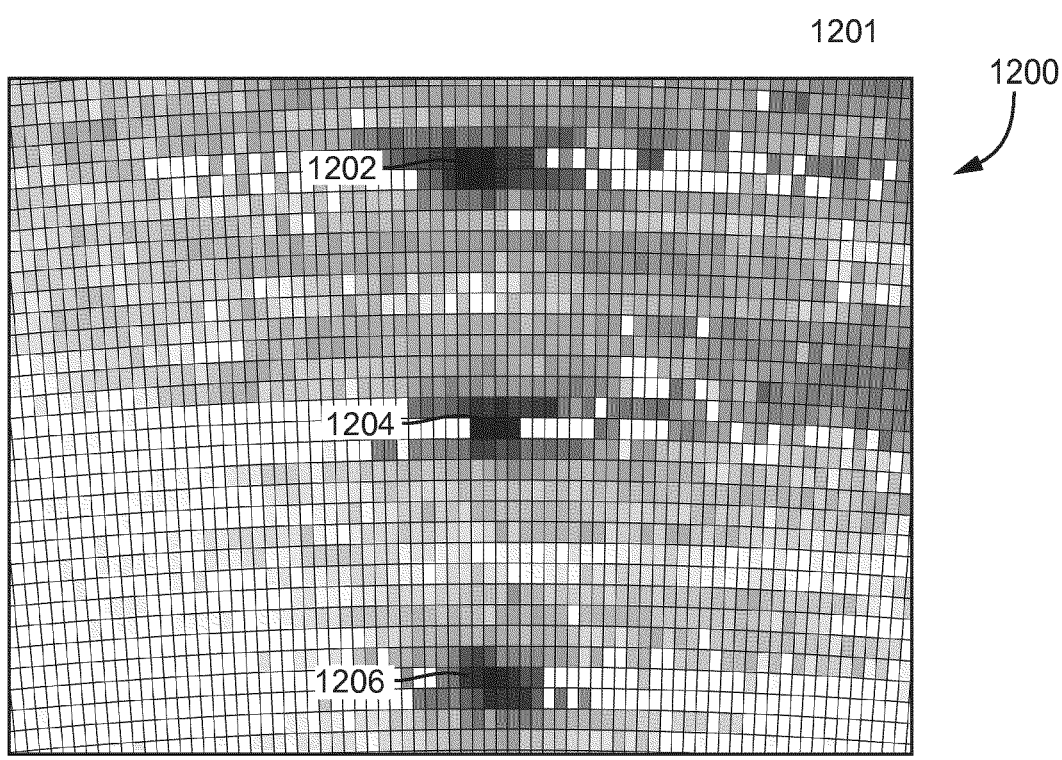
FIG. 12 is an illustration of an image derived from the radar data associated with the image illustrated in FIG. 5, wherein the individualized measurements are represented in filtered power spatial density for the polar grid cells, according to yet another exemplary embodiment of the inventive concepts disclosed herein.

With reference to FIG. 12, an image 1200 similar to the image 1100 derived from the radar data associated with the radar returns or measurements shows power spatial density in each of grid cells 1201 which are similar to grid cells 1101. The power spatial density in each grid cell 1201 is represented by a grey level. The image 1200 includes features 1202, 1204, and 1206 associated with features 1102, 1104, and 1106 (FIG. 11). Spatial filtering can be used to reduce fluctuations in the power spatial density in some embodiments. Such filtering can make the image 1200 appear less noisy in some embodiments.

Figure 13:
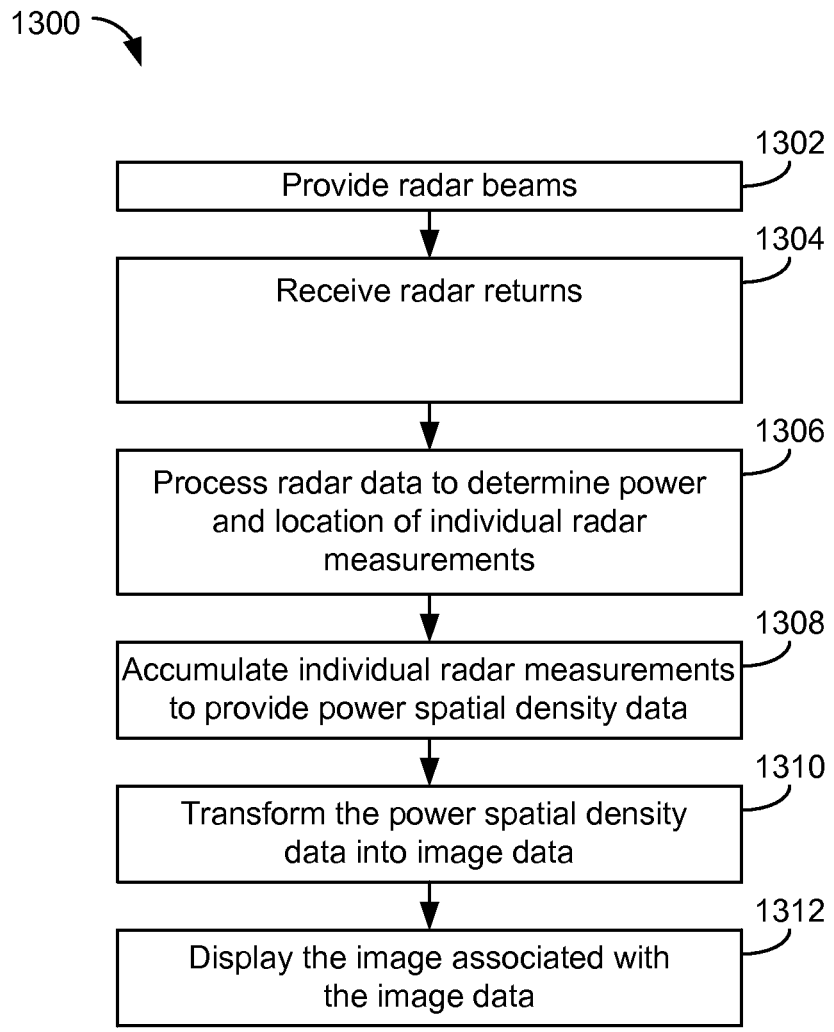
FIG. 13 is a diagram of an operational flow for the generation of image data for the display system illustrated in FIG. 2, in accordance with some embodiments of the inventive concepts disclosed herein.

With reference to FIG. 13, a flow 1300 can be performed by the vision system 10 in some embodiments. The processor 125 or other computing platform can execute flow 1300 to provide an image in response to aircraft sensor parameters and radar data. At an operation 1302 radar beams are provided by the radar antenna. At an operation 1304, radar returns are received by the radar antenna 120. At an operation 1306, the radar returns are processed to provide radar data. The radar data is used to determine the power and location of the individual radar measurements. The locations of the measurements are determined using the radar data and parameters from the aircraft sensors 130 (e.g., according to flow 300) in some embodiments. At an operation 1308, the powers of the localized measurements are accumulated over a grid cell. At an operation 1310, power spectral density data is calculated for the grid cells associated with the powers of the localized measurements. At an operation 1312, an image is displayed using image data generated from the power spatial density data at an operation 1310. The image is of a grid-based the power spatial density in some embodiments.

The scope of this disclosure should be determined by the claims, their legal equivalents and the fact that it fully encompasses other embodiments which may become apparent to those skilled in the art. All structural, electrical and functional equivalents to the elements of the above-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using an existing computer processor, or by a special purpose computer processor incorporated for this or another purpose or by a hardwired system.

Embodiments in the inventive concepts disclosed herein have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

What is claimed is:

1. A weather radar system for an aircraft, the aircraft including aircraft sensors, the weather radar system comprising:
    an antenna; and
    a control circuit coupled with the antenna and configured to provide radar beams via the antenna toward external surroundings and configured to receive radar returns, wherein the control circuit is configured to process a collection of radar measurements from the radar returns, wherein each of the radar measurements is associated with a location determined using an antenna position, an antenna attitude, a beam sharpening angle, and a range, wherein power and the location of the radar measurements are processed to determine power density per grid cell using the location for each of the radar measurements, and wherein the power density per grid cell is used to provide an image associated with the power and the location of the radar measurements, wherein the beam sharpening angle provides a higher resolution value for angle to target than the antenna position and the antenna attitude due to antenna-induced poor angular resolution, wherein the radar beams and the radar returns are provided by the antenna, the antenna being part of the weather radar system, wherein the power density per grid cell is determined for each cell of a grid, wherein each cell is associated with a number of the locations associated with the radar measurements, wherein the power density per grid cell is determined for each cell using a volume or area of each cell and an accumulation of the radar measurements for each location of the locations in each grid cell.

2. The weather radar system of claim 1, wherein the antenna position is determined using latitude, longitude and altitude sensed by the aircraft sensors.

3. The weather radar system of claim 1, wherein the antenna attitude is determined using a direction of a longitudinal axis of the aircraft sensed by the aircraft sensors and a direction of a boresight of the antenna with respect to the direction of the longitudinal axis of the aircraft.

4. The weather radar system of claim 1, wherein the antenna attitude is determined using an attitude sensor associated with the antenna.

5. The weather radar system of claim 1, wherein the beam sharpening angle is a radar sensed direction of an individual radar measurement with respect to the antenna attitude.

6. The weather radar system of claim 5, wherein the beam sharpening angle is generated using a monopulse technique, a sub-aperture radar technique, deconvolution of a beam point spread function, or any combination thereof.

7. The weather radar system of claim 1, wherein the range is a radar sensed distance between the antenna and a returned reflection of an individual measurement.

8. The weather radar system of claim 1, wherein the power density per grid cell is in a form of a two dimensional or three dimensional grid.

9. A method of providing a real time sensor image on an electronic display using an X-band or C-band airborne weather radar system, the method comprising:
    determining an antenna position,
    determining an antenna attitude;
    receiving radar returns from an X-band or C-band airborne weather radar system;
    determining a location of each of a plurality of radar measurements associated with the radar returns using the antenna position, the antenna attitude, a beam sharpening angle, and a range;
    determining a power associated with the radar measurements;
    determining a power density per grid cell associated with the power and the location of the radar measurements, wherein the power density per grid cell is determined for each cell of a grid, wherein each cell is associated with an area or a volume greater than the location of each of the radar measurements such that a plurality of locations are located in each cell, wherein the power density per grid cell is determined for each cell using the volume or area of each cell and an accumulation of the radar measurements for each location of the locations in each grid cell; and
    using the power density per grid cell to provide a real time sensor image on an electronic display, wherein the beam sharpening angle is determined by a beam sharpening process that improves antenna-induced poor angular resolution related to beam width.

10. The method of claim 9, wherein the X-band or C-band airborne weather radar system comprises a switched aperture, sequential lobing or monopulse weather radar system, and wherein the real time sensor image is a three dimensional or two dimensional image.

11. The method of claim 9, further comprising:
    providing radar beams associated with the radar returns, the radar beams being provided using beam sharpening techniques.

12. The method of claim 11, wherein the beam sharpening techniques comprise a sub-aperture or split aperture technique.

13. The method of claim 9, wherein the radar returns are provided using stepped frequency compression.

14. An enhanced vision system, comprising:
    a weather radar system configured to generate image data representative of a runway environment associated with radar returns received by the weather radar system, the radar returns being in an X-band or a C-band, wherein the weather radar system is configured to process a collection of radar measurements from the radar returns, wherein each of the radar measurements is associated with a location determined using an antenna position, an antenna attitude, a beam sharpening angle, and a range, wherein power and the location of the radar measurements are processed to determine power density per grid cell associated with the power and the location of the radar measurements, wherein the power density per grid cell is used to provide an image, wherein the power density per grid cell is determined for each cell of a grid, wherein each cell is associated with an area or a volume greater than the location of each of the radar measurements, wherein the power density per grid cell is determined for each cell using the volume or area of each cell and an accumulation of the radar measurements for each location of the locations in each grid cell, wherein the beam sharpening angle provides a higher resolution value for angle to target than the antenna attitude due to beam width; and a display in communication with the weather radar system and configured to display the image associated with the image data.

15. The enhanced vision system, of claim 14, wherein the location is determined using a slant range, wherein the slant range is a radar sensed distance between an antenna and a radar measurement associated with the radar returns.

16. The enhanced vision system, of claim 14, wherein the antenna attitude is a direction of a boresight of an antenna.

17. The enhanced vision system, of claim 14, wherein the beam sharpening angle is a radar sensed direction of a returned reflection of an individual measurement with respect to a boresight of an antenna.

18. The enhanced vision system of claim 14, wherein the beam sharpening angle is generated using a monopulse technique, a sub-aperture radar technique, deconvolution of a beam point spread function, or any combination thereof.

19. The enhanced vision system of claim 14, wherein the location is determined using a ground range, wherein the ground range is a radar sensed distance between an antenna and a radar measurement projected onto a flat ground surface.

20. The enhanced vision system of claim 14,
wherein the power density per grid cell is in a form of a two dimensional or three dimensional grid.

\* \* \* \* \*